(12) United States Patent
Adams

(10) Patent No.: US 11,547,246 B2
(45) Date of Patent: Jan. 10, 2023

(54) DRAINAGE APPARATUS AND CUTTING BOARD SYSTEM

(71) Applicant: Decent Holding Co. LLC, Lincoln, NE (US)

(72) Inventor: Matthew Adams, Lincoln, NE (US)

(73) Assignee: DECENT HOLDING CO. LLC, Lincoln, NE (US)

( * ) Notice: Subject to any disclaimer, the term of this patent is extended or adjusted under 35 U.S.C. 154(b) by 0 days.

(21) Appl. No.: 17/249,577

(22) Filed: Mar. 5, 2021

(65) Prior Publication Data

US 2021/0274979 A1  Sep. 9, 2021

Related U.S. Application Data

(60) Provisional application No. 62/986,429, filed on Mar. 6, 2020.

(51) Int. Cl.
*B23Q 3/00* (2006.01)
*A47J 47/00* (2006.01)
*A22C 17/00* (2006.01)

(52) U.S. Cl.
CPC ......... *A47J 47/005* (2013.01); *A22C 17/0013* (2013.01)

(58) Field of Classification Search
CPC .................................................. A47J 47/005
USPC .............................................. 269/289 R, 15
See application file for complete search history.

(56) References Cited

U.S. PATENT DOCUMENTS

| | | | |
|---|---|---|---|
| 3,598,164 A | 8/1971 | August | |
| 5,201,121 A | 4/1993 | Heiberg | |
| 5,366,208 A | 11/1994 | Benjamin | |
| 5,850,784 A | 12/1998 | Conner | |
| 8,132,502 B2 | 3/2012 | Pai | |
| 9,226,618 B2 | 1/2016 | Berzelak et al. | |
| 2003/0094744 A1* | 5/2003 | scott | A47J 47/005 269/289 R |
| 2008/0052799 A1 | 3/2008 | Yoo | |
| 2009/0096150 A1* | 4/2009 | Cihan | A47J 47/005 269/289 R |

(Continued)

OTHER PUBLICATIONS

International Search Report and Written Opinion for PCT/US2021/70238 dated Aug. 5, 2021; pp. 1-11.

*Primary Examiner* — Joseph J Hail
*Assistant Examiner* — Shantese L McDonald
(74) *Attorney, Agent, or Firm* — Husch Blackwell LLP

(57) ABSTRACT

A drainage apparatus and a reinforced cutting board system that resists warping and is adapted to collect, store, and manage fluids, liquids, or juices resulting from the use of a cutting board without reducing an effective cutting area of the cutting board's cutting surface, and an associated method for making the same. The drainage apparatus generally featuring a continuous lateral member, which can define a fluid channel. The drainage apparatus being capable of effectively collecting, storing, and managing fluids, liquids, or juices through the use of the fluid channel. The reinforced cutting board system generally featuring a cutting board body, a drainage apparatus, and a reinforcing system. The reinforcing system being capable of effectively resisting warping. The method of making the cutting board system generally comprising providing suitable material, forming a desired shape, and providing a drainage apparatus.

13 Claims, 9 Drawing Sheets

(56) References Cited

U.S. PATENT DOCUMENTS

| | | |
|---|---|---|
| 2009/0166943 A1 | 7/2009 | Raschkov |
| 2009/0208625 A1 | 8/2009 | Slevkoff et al. |
| 2010/0005977 A1 | 1/2010 | Menashes |
| 2014/0027966 A1* | 1/2014 | Constantino, Jr. ....... A47J 47/16 269/15 |
| 2014/0091508 A1 | 4/2014 | Chalifoux |
| 2014/0255572 A1* | 9/2014 | Lewallen ................. A47J 45/02 426/416 |
| 2015/0257608 A1* | 9/2015 | Torlai ..................... A47J 47/005 269/15 |
| 2017/0020341 A1 | 1/2017 | Farmer |
| 2019/0125134 A1* | 5/2019 | Colletti .................. B65D 47/30 |

* cited by examiner

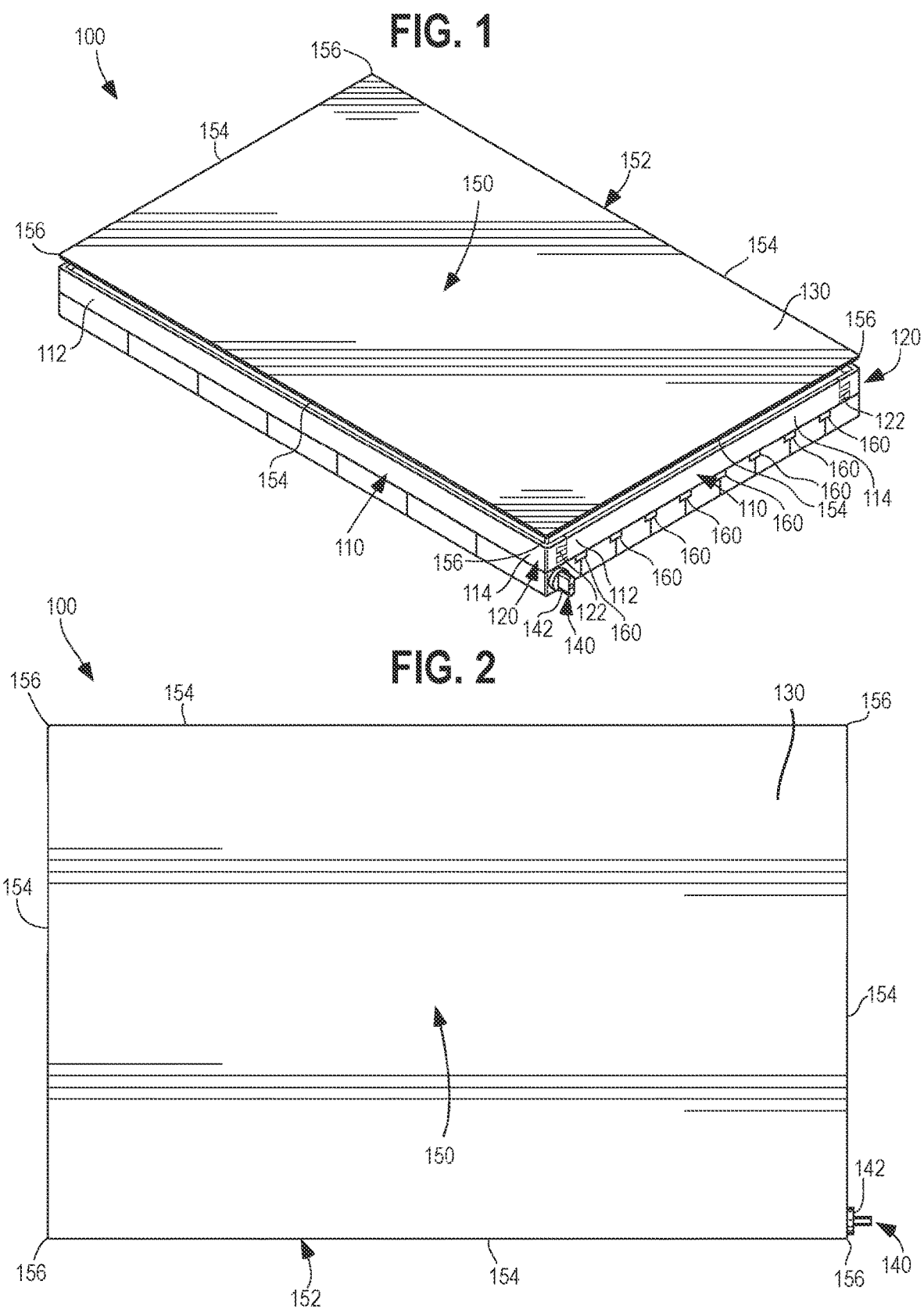

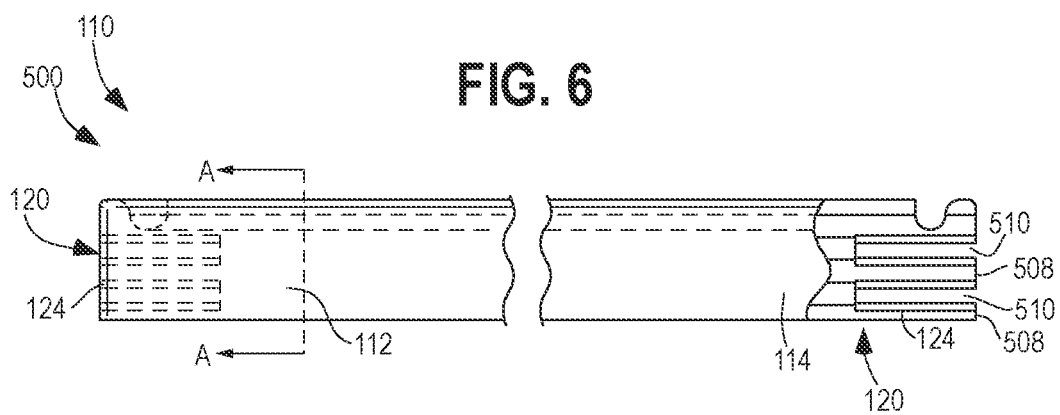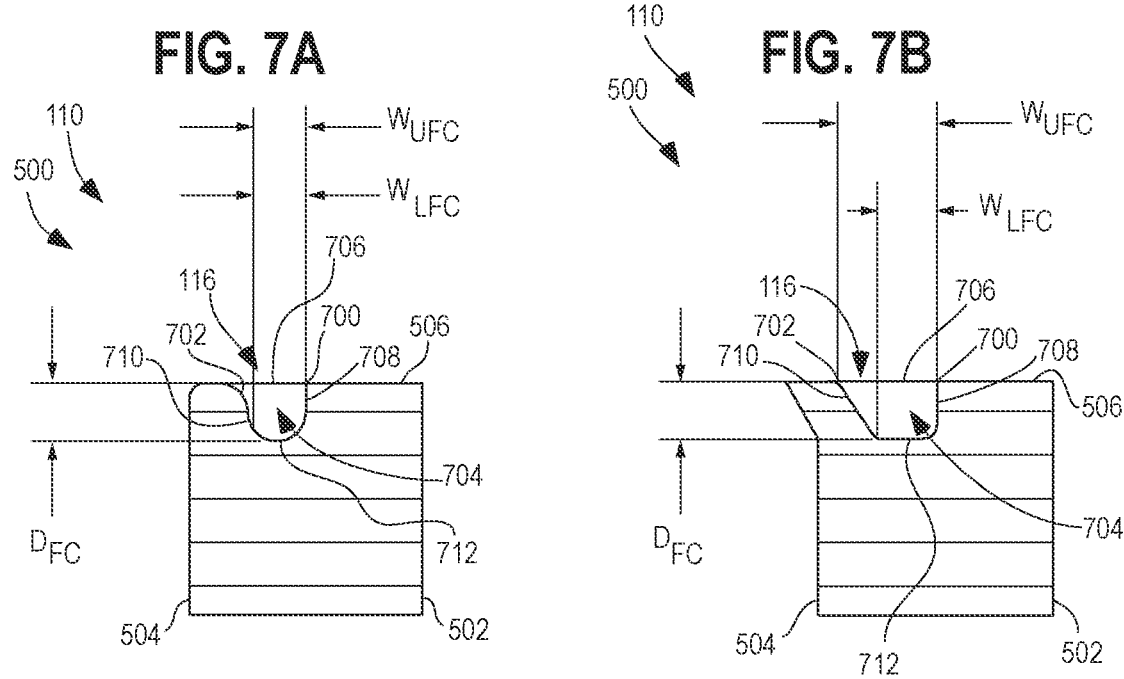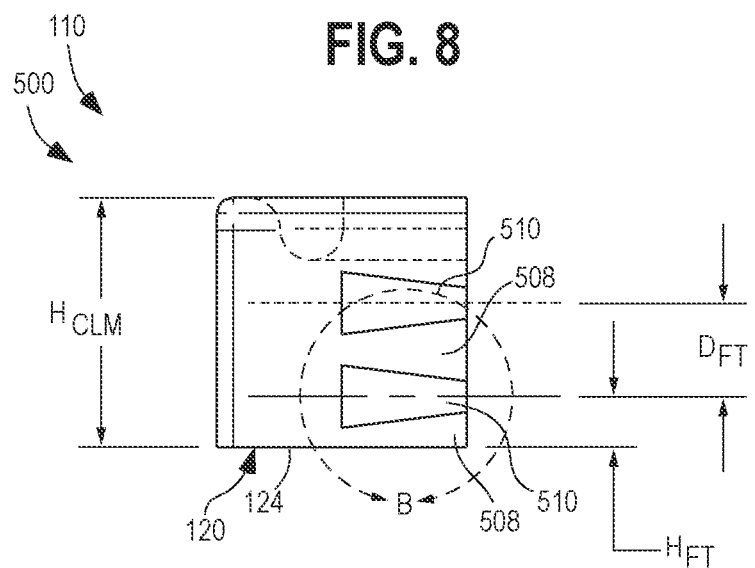

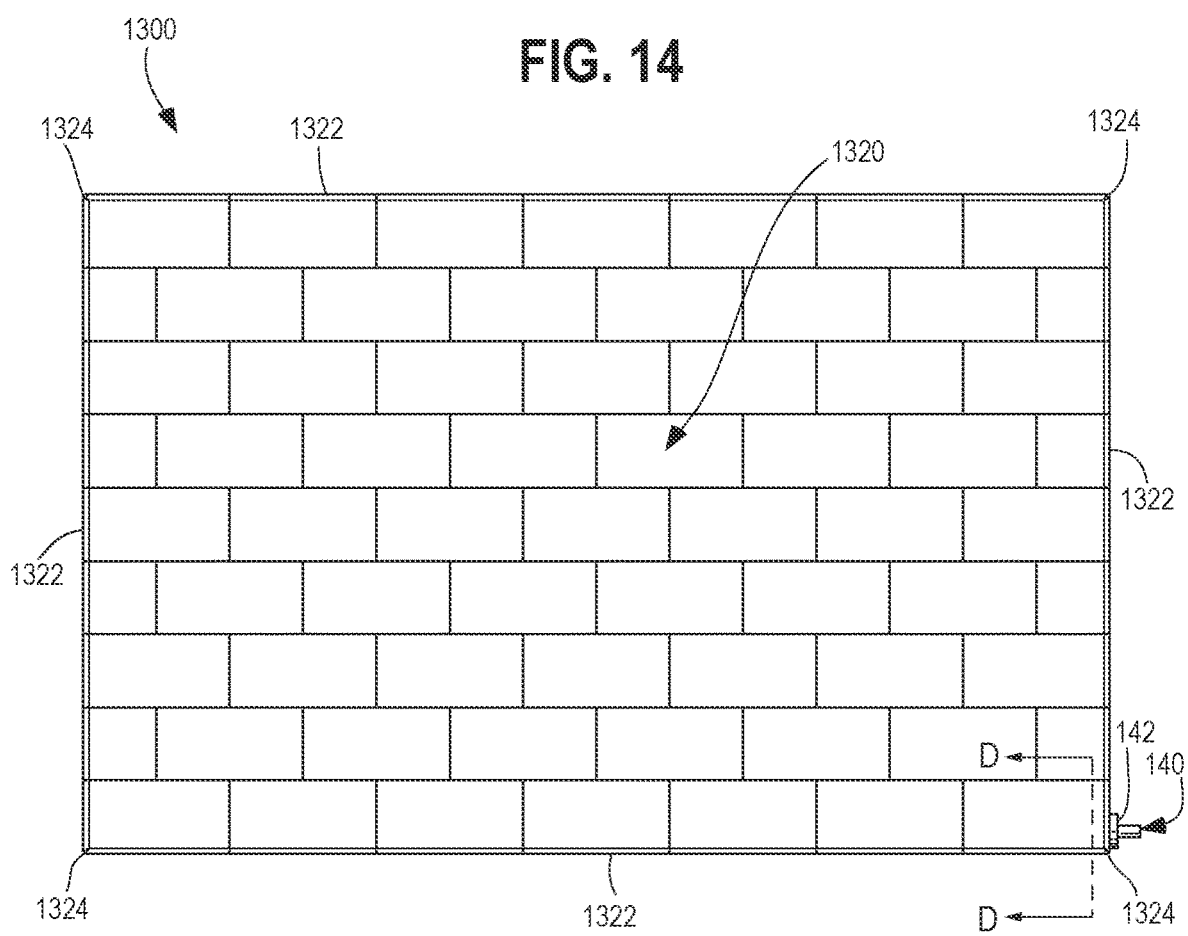
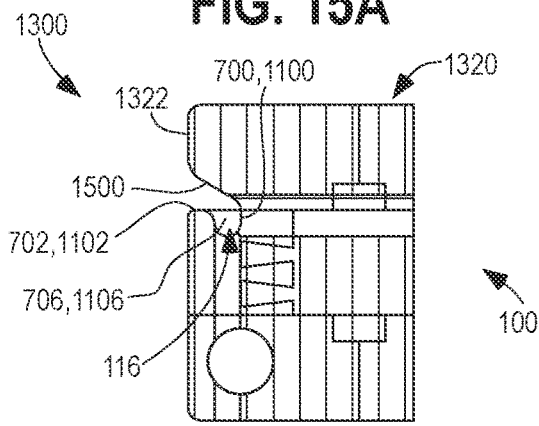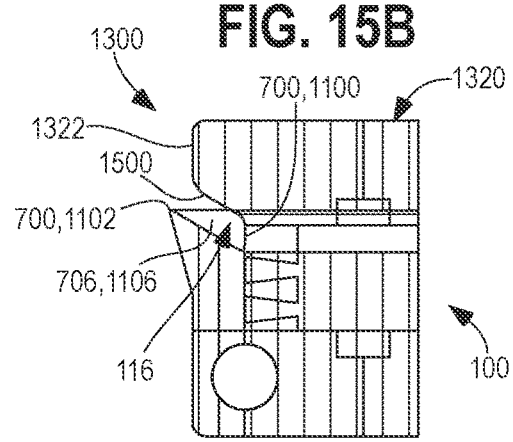
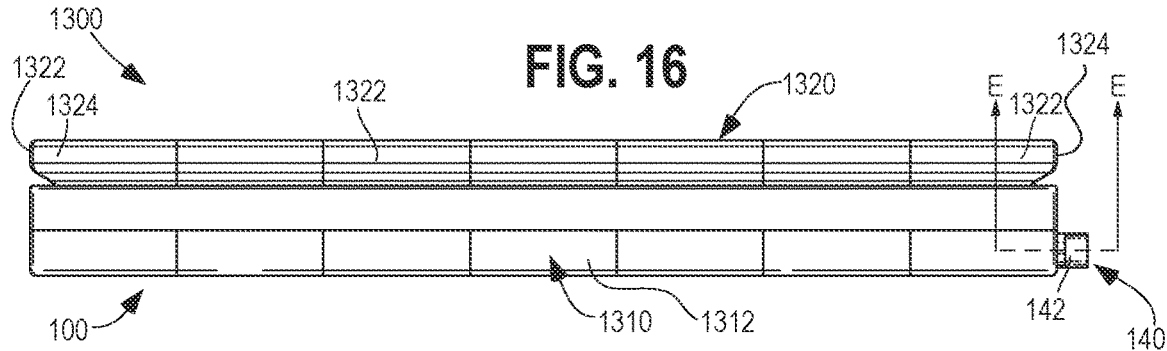

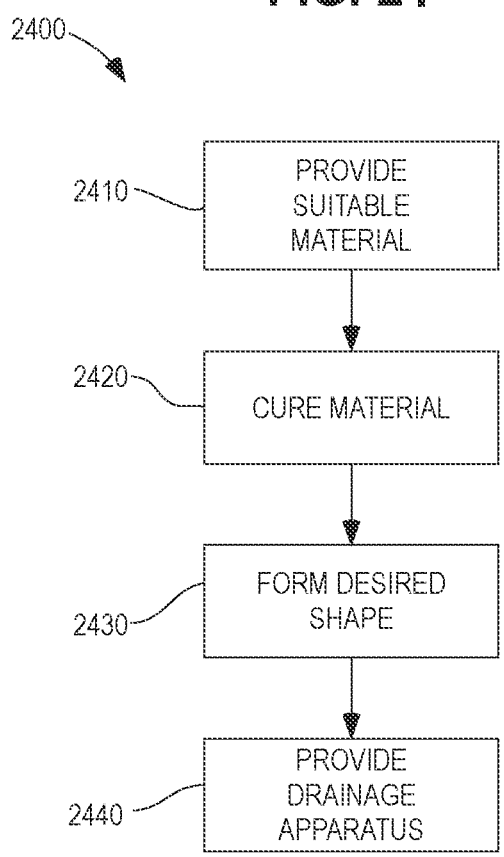

DRAINAGE APPARATUS AND CUTTING BOARD SYSTEM

CROSS-REFERENCE TO RELATED APPLICATIONS

This application claims priority to U.S. Provisional Patent Application No. 62/986,429, filed Mar. 6, 2020, to Matthew Adams, entitled "Drainage Apparatus and Cutting Board System," the entire disclosure of which, including the specification and drawings, is incorporated herein by reference.

FIELD OF INVENTION

The present invention relates generally to cutting boards and, more particularly, to a drainage apparatus and a cutting board system. The drain apparatus and the cutting board system being adapted to prevent warping and removes fluids, liquids, or juices from a cutting surface.

BACKGROUND OF THE INVENTION

Cutting boards, chopping boards, butcher blocks and the like are commonly used by persons when chopping and preparing food. Such devices provide a clean durable cutting surface and come in a variety of shapes and sizes. These devices are commonly made from wood, plastic, glass, marble, and steel. Wooden cutting boards can be formed as either edge-grain or end-grain cutting boards. Edge-grain cutting boards can consist of long strips of wood assembled and fused together with the grain running parallel to the surface. End-grain cutting boards can consist of the end pieces of wood assembled and fused together with the grain running perpendicular to the surface. End-grain cutting boards typically come in a checkerboard pattern. In end-grain cutting boards, the wooden fibers face upwards on the surface of the cutting board.

End-grain cutting boards are susceptible to warping, more specifically, bowing, contraction, expansion, and splitting. Warping typically results from excess fluids, liquids, or juices being left on the board after use. The exposed wood fibers on the surface of the cutting board soak up fluids, liquids, or juices more easily than other cutting boards. In order to prevent the board from warping, the board must be regularly dried, including during and after use.

Aside from warping, another deficiency of traditional cutting boards includes the inability of cutting boards to effectively drain fluids, liquids, or juices from the cutting surface of the cutting board without negatively affecting or reducing the effective cutting area of the cutting surface. Some cutting boards can include small circular or rounded rectangularly holes in the cutting surface to drain fluids, liquids, or juices away from the cutting surface. Other cutting boards can include juice rings or semi-circular grooves or indentations along at least one portion of the cutting surface to collect fluids, liquids, or juices away from the rest of the cutting surface. However, both the holes and the juices ring reduce the effective cutting area of the cutting surfaces of cutting boards. This renders the cutting board generally inefficient, because the cutting board must provide a profile larger than the profile of the effective cutting area in order to house the holes and/or juice ring.

Accordingly, a need exists for an improved drainage apparatus and cutting board system that is less susceptible to warping. Further, an additional need exists for an improved drainage apparatus and cutting board system that collects, stores, and manages fluids, liquids, or juices resulting from the use of the cutting board without reducing the effective cutting area of the cutting surface.

SUMMARY OF THE INVENTION

Disclosed herein is a drainage apparatus and a reinforced cutting board system that is less susceptible to warping and adapted to collect, store, and manage fluids, liquids, or juices resulting from the use of a cutting board without reducing an effective cutting area of the cutting board's cutting surface, and an associated method for making the same.

The drainage apparatus can generally comprise at least one continuous lateral member. The at least one continuous lateral member can define a fluid channel and a generally planar bearing surface coupled to the fluid channel. The fluid channel can comprise a distal lip, and the generally planar bearing surface can be located proximate the distal lip. In one embodiment, the generally planar bearing surface can be located at a greater elevation than the fluid channel. In another embodiment, the at least one continuous lateral member can define a continuous unitary fluid channel. In yet another embodiment, the drainage apparatus can further comprise a connection element coupled to the at least one continuous lateral member. In one embodiment, the drainage apparatus can further comprise a drainage device in fluid communication with the fluid channel, and the drainage device can comprise a drainage tube and a drainage valve. In another embodiment, the drainage device can further comprise a drainage reservoir in fluid communication with the drainage tube.

The reinforced cutting board system can generally comprise a cutting board body and a reinforcing system. The cutting board body can define a generally planar cutting surface, and the generally planar cutting surface can comprise at least one side edge. The reinforcing system can be coupled to the generally planar cutting surface. In one embodiment, the reinforced cutting board system can further comprise a drainage apparatus. The drainage apparatus can be in fluid communication with the generally planar cutting surface and generally comprise at least one continuous lateral member. The at least one continuous lateral member can define a fluid channel, and the fluid channel can comprise a distal lip. The at least one side edge of the generally planar cutting surface can be vertically aligned with the distal lip of the fluid channel. In another embodiment, the at least one side edge of the generally planar cutting surface can be located proximate the distal lip of the fluid channel. In yet another embodiment, the reinforced cutting board system can further comprise at least one sloped surface. The at least one sloped surface can be in fluid communication with the generally planar cutting surface and the drainage apparatus. The at least one sloped surface can be located at a lesser elevation than the generally planar cutting surface and at a greater elevation than the fluid channel. In one embodiment, the at least one continuous lateral member can define a continuous unitary fluid channel. In another embodiment, the drainage apparatus can further comprise a connection element coupled to the at least one continuous lateral member. In yet another embodiment, the cutting board body can define a recess for receiving at least one continuous lateral member. In one embodiment, the reinforcing system can comprise a plurality of structural supports. The plurality of structural supports can be generally rectangular in shape. The plurality of structural supports can also be generally cylindrical in shape.

The method for making the cutting board system can generally comprise the steps of providing a suitable material, forming a desired shape of the cutting board system, and providing a drainage apparatus. The drainage apparatus can generally comprise at least one continuous lateral member defining a fluid channel, and the fluid channel can comprise a distal lip. In one embodiment, the step of forming a desired shape of the cutting board system can further comprise the steps of providing a plurality of structural supports and coupling the structural supports to the cutting board system. The plurality of structural supports can be generally cylindrical in shape. In another embodiment, the step of forming a desired shape of the cutting board system can further comprise the steps of preparing the suitable material into a plurality of long rectangular prisms, assembling the plurality of long rectangular prisms to abut and be adjacent, fusing the plurality of long rectangular prisms together to form a combined piece of material, sectioning off a plurality of portions of the combined piece of material, and assembling the plurality of portions to form a general shape of the cutting board system. The step of sectioning off a plurality of portions of the combined piece of material can further comprise the step of cutting the combined piece of material into the plurality of portions, wherein the plurality of portions can have a generally uniform height. In yet another embodiment, the step of forming a desired shape of the cutting board system can further comprise the steps of providing a plurality of structural supports, forming a support recess within the plurality of portions, receiving the structural supports within the support recess, and coupling the structural supports to the cutting board system. The support recesses can define a cross-section that corresponds with the structural supports. In one embodiment, the step of providing a drainage apparatus can further comprise the steps of forming an apparatus recess within the cutting board system and receiving the drainage apparatus within the apparatus recess. The drainage apparatus can further comprise a connection element coupled to the at least one continuous lateral member.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views:

FIG. 1 is a perspective view of a drainage apparatus in accordance with one embodiment of the present invention;

FIG. 2 is a top view of the drainage apparatus of FIG. 1;

FIG. 6 is a front elevation view of the first lateral member of FIG. 5;

FIG. 7A is a first cross-sectional side elevation view of the first lateral member of FIGS. 5 and 6, taken along view line A-A of FIG. 6;

FIG. 7B is a second cross-sectional side elevation view of the first lateral member of FIGS. 5 and 6;

FIG. 8 is a side elevation view of the first lateral member of FIGS. 5-7;

FIG. 14 is a top view of the cutting board of FIG. 13;

FIG. 15A is a first partial cross-sectional view of the cutting board system of FIGS. 13 and 14, taken along view line D-D of FIG. 14;

FIG. 15B is a second partial cross-sectional view of the cutting board system of FIGS. 13 and 14;

FIG. 16 is a front elevation view of the cutting board system of FIGS. 13-15;

FIG. 24 is a flowchart of an exemplary embodiment of a method for manufacturing a cutting board system that may be implemented using the cutting board system of FIGS. 13-24.

DETAILED DESCRIPTION OF THE INVENTION

Figure 3:
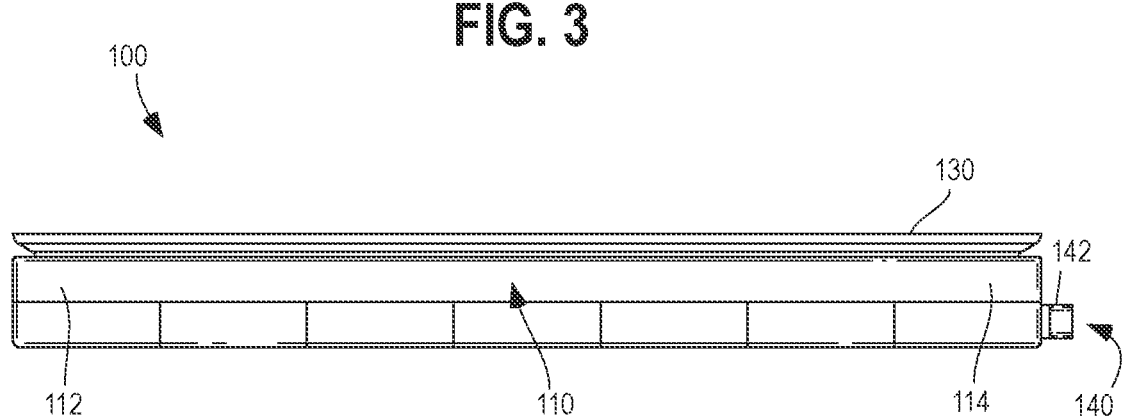
FIG. 3 is a front elevation view of the drainage apparatus of FIGS. 1 and 2.

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be understood that any dimensions included in herein are simply provided as examples and dimensions other than those provided therein are also within the scope of the invention.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention.

As set forth herein, one embodiment of the present invention is directed to a drainage apparatus that is adapted for removing fluids, liquids, or juices from a cutting surface or cutting board. Referring to the figures, illustrated is a drainage apparatus adapted for use with a cutting surface, and more specifically, a drainage apparatus that is capable of removing fluids, liquids, or juices without reducing the effective cutting area of the cutting surface. As described herein, the drainage apparatus can be removably coupled to or affixedly attached to the cutting surface. It will be understood that the drainage apparatus described herein can be used in connection with a variety of planar cutting surfaces and cutting boards of various sizes and shapes.

As shown in FIGS. 1-4, in one embodiment, the drainage apparatus 100 can generally comprise at least one continuous lateral member 110, at least one connection element 120, a bearing surface 130, and a drainage device 140.

As best illustrated in FIG. 1, in one embodiment, the drainage apparatus 100 can generally define a rectangular prism. In one embodiment, the drainage apparatus 100 can have a height of approximately two (2) inches, a width of approximately fourteen and five eights (14.625) inches, and a length of approximately twenty-two and third quarters (22.75) inches. As further shown in FIG. 1, in one embodiment, the at least one continuous lateral member 110 can extend along the lengths and/or widths of the perimeter of the drainage apparatus 100. Each continuous lateral member 110 can define a first terminus or end point 112 and a second terminus or end point 114.

The at least one continuous lateral member 110 can be comprised of various materials. In one embodiment, the at least one continuous lateral member 110 can be comprised of a single material. The at least one continuous lateral member 110 can be comprised of wood, including, without limitation, maple, walnut, cherry, beech, teak, bamboo, any other suitable wood or wood-like material, whether presently known or later developed, and any combination thereof. In another embodiment, the at least one continuous lateral member 110 can be comprised of a synthetic material, including, without limitation, silicone and other polymers, various rubbers, polyethylene ("PE"), high-density polyethylene ("HDPE"), and other plastics, any other suitable synthetic material, whether presently known or later developed, and any combination thereof. In yet another embodiment, the at least one continuous lateral member 110 can be comprised of a metal or alloy, including, without limitation, aluminum or aluminum alloys, magnesium, titanium, and beryllium alloys, any other suitable lightweight structural metal or alloy, whether presently known or later developed, and any combination thereof. In one embodiment, the at least one continuous lateral member 110 can be comprised of multiple materials. The at least one continuous lateral member 110 can be comprised of any suitable combination of wood or wood-like materials, plastics, and/or metals.

In one embodiment, the at least one continuous lateral member 110 can comprise two distinct materials used in combination, joined together, or otherwise coupled to each other. In one such embodiment, a metal or alloy can be located at a proximate portion of the at least one continuous lateral member 110, and a synthetic material can be located at a distal portion of the at least one continuous lateral member 110. As used herein, "proximate" shall refer to a position generally situated near a common center point of the drainage apparatus 100, and "distal" shall refer to a position generally situated away from a common center point of the drainage apparatus 100. The distal portion can be located immediately adjacent the proximate portion, such that, in one embodiment, the synthetic material can abut and be distal of the metal or alloy. The proximate portion can define a proximate cross-section, and the distal portion can define a distal cross-section. The proximate cross-section and the distal cross-section can define generally symmetrical rectangular shapes, which correspond in shape and size. The shape and size of the proximate cross-section and the distal cross-section can vary depending structural properties of the materials used therewith. It will be understood that the proximate cross-section and the distal cross-section can define any suitable symmetrical or nonsymmetrical geometrical shape, including, without limitation, a square and so on, and be any suitable size, whether or not corresponding to each other. Together, the proximate cross-section and the distal cross-section can comprise the effective cross-section of the at least one continuous lateral member 110.

In one embodiment, at least one connection element 120 can be coupled to the at least one continuous lateral member 110, including at the first end point 112 and/or the second end point 114, to sealingly connect the at least one continuous lateral member 110. The connection element 120 can be adapted to securingly and sealingly engage, couple, or connect at least one continuous lateral member 110 to itself or to another continuous lateral member or member 110. Such sealing connection created by the connection element 120 can create a water-tight seal between the various connected elements. In one embodiment, the connection element 120 can be adapted to create a single completely self-coupled continuous lateral member 110. The completely self-coupled continuous lateral member 110 can be achieved by joining the first end point 112 of the continuous lateral member 110 to the second end point 114 of the continuous lateral member 110. In such embodiment, the continuous lateral member 110 can be comprised of a flexible material and/or define a generally complete profile shape, such a complete circle, square, rectangle, and so on, so that the first end point 112 of the continuous lateral member 110 can be joined to the second end point 114 of the same continuous lateral member 110 to create a connection point 122. In another embodiment, the connection element 120 can sealingly connect a first continuous lateral member 110 to a second continuous lateral member 110, to create a completely coupled series of continuous lateral members 110, by joining either the first end point 112 or the second end point 114 of the first continuous lateral member 110 to the first end point 112 or the second end point 114 of the second continuous lateral member 110 to create connection points 122. It will be understood that the at least one connection element 120 can be used to sealingly connect any number of the at least one continuous lateral members 100.

As shown in FIG. 1, in one embodiment, the drainage apparatus 100 can comprise four separate continuous lateral members 110. Each continuous lateral member 110 can be removably coupled to or affixedly attached to other continuous lateral members 110 at their respective termini or end points 112, 114. Further, the four continuous lateral members 110 can be coupled to and joined by four connection elements 120 located at the corners of the drainage apparatus 100 to create a completely coupled series of continuous lateral members 110. As removably coupled elements, each continuous lateral member 110 can be selectively removed and replaced, including for cleaning, maintenance, replacement, retrofitting, or any other desirable purpose, as necessary. As shown in FIG. 1, the profile of the bearing surface 130 can generally correspond with the rectangular profile of the drainage apparatus, and the completely coupled series of continuous lateral members 110 can define a rectangular profile corresponding the profile of the bearing surface 130.

As further shown in FIG. 1, the drainage device 140 can be located generally at one of the corners of the drainage apparatus 100. However, it will be understood that the drainage device 140 can be located at any suitable location on the drainage apparatus 100. In one embodiment, the drainage device 140 of the drainage apparatus 100 can be in fluid communication with the at least one continuous lateral member 110. In one embodiment, the drainage device 140 can further comprise a drainage valve 142, a drainage tube (not shown), and a drainage reservoir (not shown).

In another embodiment, the drainage apparatus 100 can further comprise a pedestal 150, and the pedestal 150 can define the bearing surface 130. The pedestal 150 can generally comprise a peripheral edge 152. The peripheral edge 152 can comprise a plurality of side edges 154 and corners 156. In one embodiment, the peripheral edge 152 can comprise four (4) side edges 154 and four corners 156. However, it will be understood that the peripheral edge 152 can comprise any number of side edges 154 and corners 156. Additionally, although the peripheral edge 152 is depicted as defining a generally rectangular shape, it will be understood that the peripheral edge 152 can assume any suitable symmetrical or nonsymmetrical geometrical shape, including, without limitation, a circle, a square, a pentagon, a hexagon, and so on. In one embodiment, the pedestal 150 can be integrally formed with the drainage apparatus 100. In another embodiment, the pedestal 150 can be provided separate from the other components of the drainage apparatus 100. The pedestal 150 can be comprised of various materials, including a single material or a combination of multiple materials. In one embodiment, the pedestal 150 can be comprised of wood, including, without limitation, maple, walnut, cherry, beech, teak, bamboo, any other suitable wood or wood-like material, whether presently known or later developed, and any combination thereof. In another embodiment, the pedestal 150 can be comprised of a plastic, including, without limitation, PE, HDPE, any other suitable plastic, whether presently known or later developed, and any combination thereof. It will be understood that the pedestal 150 can be comprised of any suitable combination of wood or wood-like materials, plastics, and/or any other suitable materials.

In one embodiment, at least one continuous lateral member 110 can be located adjacent to the pedestal 150. The at least one continuous lateral member 110 can be located immediately adjacent to the pedestal 150, such that there is little to no space defined between the peripheral edge 152 and the at least one continuous lateral member 110. In another embodiment, the at least one continuous lateral member 110 can be located adjacent to the pedestal 150 in a manner such that there is a space defined between the pedestal 150 and the at least one continuous lateral member 110. As best illustrated in FIG. 1, in even yet another embodiment, the at least one continuous lateral member 110 can entirely surround and enclose the peripheral edge 152 of the pedestal 150.

In yet another embodiment, the drainage apparatus 100 can further comprise at least one structural support 160. The at least one structural support 160 can be coupled to the bearing surface 130 and/or the pedestal 150. In one embodiment, the at least one structural support 160 can be coupled to the bearing surface 130 in a horizontally longitudinal orientation. In another embodiment, the at least one structural support 160 can be coupled to the bearing surface 130 in a horizontally transverse orientation. However, it will be understood that the at least one structural support 160 can be coupled to the bearing surface 130 in any suitable manner to provide the necessary reinforcement. In one embodiment, the at least one structural support 160 can be provided separate from the bearing surface 130. In such embodiment, the at least one structural support 160 can be removably coupled to the bearing surface 130. However, it will be understood that the at least one structural support 160 can be affixedly attached to the bearing surface 130. In another embodiment, the at least one structural support 160 can be integrally formed with the pedestal 150. For example, in one embodiment, the at least one structural support 160 can be received within the pedestal 150 in recesses created during the manufacture of the pedestal 150. The cross-section of such recesses can generally correspond with the effective cross-section of the at least one structural support 160, such that the recesses can receive the at least one structural support 160. Where the pedestal 150 is comprised of wood or wood-like material, the recesses can be machined or milled into the pedestal 150 or individual elements comprising the pedestal 150, including without limitation, staves, to create a dado cutting across or perpendicular to the grain of the wood or wood-like material, or a groove cutting with or parallel to the grain of the wood or wood-like material. The recesses can run from edge-to-edge of the pedestal 150 and comprise a through dado or groove, or the recesses can end before it meets one or more edges of the pedestal 150 and comprise a stopped dado or groove. In another embodiment, the recesses can be formed by drilling holes into the wood or wood-like material of the pedestal 150. Where the pedestal 150 is comprised of synthetic material, including moldable plastics, the recesses can be molded or formed into the pedestal 150. The at least one structural support 160 can placed within the recesses of the pedestal 150, within the recesses of the individual elements comprising the pedestal 150, or between the individual elements comprising the pedestal 150 as the pedestal 150 is being manufactured.

In one embodiment, the at least one structural support 160 can be coupled or joined to the pedestal 150 through the use of glue or similar adhesives. However, it will be understood that the at least one structural support 160 can be joined to the pedestal 150 through the use of any suitable fastening means, including, without limitation, any other suitable adhesives, bolts, screws, pins, clamping members, any other suitable fastening means, whether presently known or later developed, and any combination thereof.

In one embodiment, the at least one structural support 160 can be comprised of wood, including, without limitation, maple, walnut, cherry, beech, teak, bamboo, any other suitable wood or wood-like material, whether presently known or later developed, and any combination thereof. In another embodiment, the at least one structural support 160 can be comprised of a plastic, including, without limitation, PE, HDPE, any other suitable plastic, whether presently known or later developed, and any combination thereof. It will be understood that the at least one structural support 160 can be comprised of any suitable combination of wood or wood-like materials, plastics, and/or any other suitable materials, including from the same, similar, or different materials as the cutting board body of the pedestal 150.

As best illustrated in FIG. 2, in one embodiment, the bearing surface 130 can be generally rectangular. However, it will be understood that the bearing surface 130 can assume any suitable symmetrical or nonsymmetrical geometrical shape, including, without limitation, a square, a pentagon, a hexagon, and so on.

Figure 4:
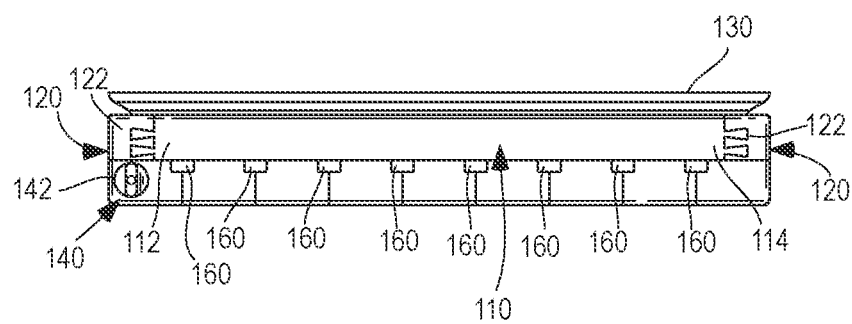
FIG. 4 is a side elevation view of the drainage apparatus of FIGS. 1-3.

As best illustrated in FIGS. 3 and 4, in one embodiment, the bearing surface 130 can be generally planar or mostly flat. As shown in FIGS. 3 and 4, the bearing surface 130 can be located above or at a greater elevation than the at least one continuous lateral member 110. The at least one continuous lateral member 110 can be located above or at a greater elevation than the drainage device 140. However, it will be understood that the bearing surface 130 can be located below or at a lesser elevation than the at least one continuous lateral member 110. In such an embodiment, the drainage apparatus 100 can generally define a tray with at least one raised edge defined by the at least one continuous lateral member 110, and be capable of receiving a variety of devices, including a cutting surface.

As best illustrated in FIG. 4, the drainage apparatus 100 can comprise a plurality of structural supports 160. In one embodiment, the structural supports 160 can be located within the drainage apparatus 100 at regular distances or horizontal intervals. However, it will be understood that the structural supports 160 can be provided in any suitable manner.

Figure 5:
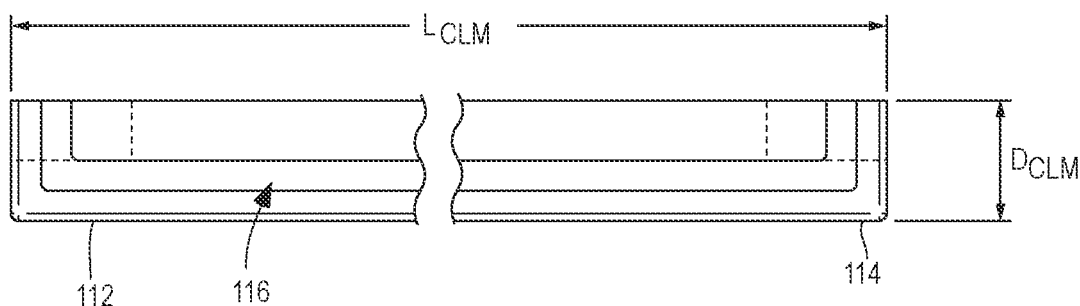
FIG. 5 is a top view of a first lateral member of a drainage apparatus in accordance with one embodiment of the present invention.

As shown in FIG. 5, the at least one continuous lateral member 110 can define a fluid channel 116. The fluid channel 116 can generally extend between the first end point 112 and the second end point 114 of the at least one continuous lateral member 110 and define a fluid channel length (not shown). As shown in FIGS. 1-5, the bearing surface 130 of the drainage apparatus 100 can be coupled to a fluid channel 116. In one embodiment, the bearing surface 130 can be located above or at a greater elevation than the fluid channel 116. However, it will be understood that the bearing surface 130 can be located below or at a lesser elevation than the fluid channel 116. In one embodiment, the drainage device 140 of the drainage apparatus 100 can be in fluid communication with a fluid channel 116.

In one embodiment, the fluid channel 116 can be located in a proximate portion of the at least one continuous lateral member 110, including in the metal or alloy thereof. In another embodiment, the fluid channel 116 can be located in a distal portion of the at least one continuous lateral member 110, including in the synthetic material thereof. In yet another embodiment, the at least one continuous lateral member 110 can define two fluid channels 116, with one fluid channel 116 located in the proximate portion of the at least one continuous lateral member 110 and the other fluid channel 116 located in the distal portion of the at least one continuous lateral member 110. In such embodiment where the at least one continuous lateral member 110 can define multiple fluid channels 116, the fluid channels 116 can be separate and not in fluid communication. In another embodiment, where the at least one continuous lateral member 110 can define multiple fluid channels 116, the fluid channels 116 can be interconnected and in fluid communication. In one embodiment, a fluid channel 116 can be machined or milled into wood or wood-like material comprising the respective portion of the at least one continuous lateral member 110. In another embodiment, a fluid channel 116 can be molded or formed into synthetic material, including moldable plastics, comprising the respective portion of the at least one continuous lateral member 110.

Where the connection element 120 sealingly connects to create either a completely self-coupled continuous lateral member 110 or a completely coupled series of continuous lateral members 110, the fluid channel or fluid channels 116 defined by the respective continuous lateral members 110 can be combined to define a continuous unitary fluid channel 116. In another embodiment, where the connection element 120 creates a water-tight sealing connection between the various connected elements, the continuous unitary fluid channel 116 can be capable of adequately collecting, retaining, and managing fluids, liquids, or juices.

As shown in FIG. 5, the first end point 112 and the second end point 114 of the at least one continuous lateral member 110 can define a length LCLM of the at least one continuous lateral member 110. In one embodiment, the length LCLM can be between approximately six (6) inches and two hundred and forty (240) inches. In another embodiment, the length LCLM can be between approximately ten (10) inches and thirty (30) inches. In yet another embodiment, the length LCLM can be approximately twenty-two and three quarters (22.75) inches. In even yet another embodiment, the length LCLM can be approximately fourteen and five eighths (14.625) inches. As further shown in FIG. 5, the at least one continuous lateral member 110 can define a depth $D_{CLM}$. In one embodiment, the depth $D_{CLM}$ can be between approximately one-quarter (0.25) inch and three and one-half (3.5) inches. In another embodiment, the depth $D_{CLM}$ can be between approximately one-half (0.5) inch and one and one-half (1.5) inches. In yet another embodiment, the depth $D_{CLM}$ can be approximately one (1) inch.

FIGS. 5-9 depict a first continuous lateral member 500. Such first continuous lateral member 500 can correspond with the length or lengths of the drainage apparatus 100. As best illustrated in FIGS. 7A and 7B, the first continuous lateral member 500 can define a fluid channel 116 and generally comprise a proximate vertical edge 502, a distal vertical edge 504, and a generally planar or mostly flat upper surface 506. The upper surface 506 can be adjacent the proximate vertical edge 502 and/or the distal vertical edge 504. As best illustrated in FIGS. 7A and 7B, the fluid channel 116 can comprise a proximate rim or lip 700, a distal rim or lip 702, and a gutter 704. The upper surface 506 can be located proximate the proximate lip 700, the distal lip 702, and/or the gutter 704, as shown in FIGS. 7A and 7B. The gutter 704 can comprise a proximate sidewall 708 and a distal sidewall 710. In one embodiment, the proximate lip 700 can form hard edges or right angles. As best illustrated in FIG. 7A, in another embodiment, the distal lip 702 can be rounded, chamfered, or beveled. As best illustrated in FIG. 7B, in yet another embodiment, the distal lip 702 can form an obtuse-angled edge. However, it will be understood that the proximate lip 700 and/or the distal lip 702 can form any edge or assume any suitable shape. As best illustrated in FIGS. 7A and 7B, the proximate lip 700 and the distal lip 702 can define a gap 706. The gap 706 can define an upper fluid channel width $W_{UFC}$. In one embodiment, the upper fluid channel width $W_{UFC}$ can be between approximately one-sixteenth (0.0625) inch and two (2) inches. In another embodiment, the upper fluid channel width $W_{UFC}$ can be between approximately one-eighth (0.125) inch and one (1) inch. In yet another embodiment, the upper fluid channel width $W_{UFC}$ can be approximately one-quarter (0.25) inch. As further illustrated in FIGS. 7A and 7B, the proximate sidewall 708 and the distal sidewall 710 can define a lower fluid channel width $W_{LFC}$. In one embodiment, the lower fluid channel width $W_{LFC}$ can be between approximately one-sixteenth (0.0625) inch and two (2) inches. In another embodiment, the lower fluid channel width $W_{LFC}$ can be between approximately one-eighth (0.125) inch and one (1) inch. In yet another embodiment, the lower fluid channel width $W_{LFC}$ can be approximately one-quarter (0.25) inch.

The gutter 704 of the fluid channel 116 can comprise a depression 712 extending downward from and in communication with the gap 706. The gap 706 and the depression 712 can define a fluid channel depth $D_{FC}$. In one embodiment, the fluid channel depth $D_{FC}$ can be between approximately one-sixteenth (0.0625) inch and two (2) inches. In another embodiment, the fluid channel depth $D_{FC}$ can be between approximately one-eighth (0.125) inch and one (1) inch. In yet another embodiment, the fluid channel depth $D_{FC}$ can be approximately one-quarter (0.25) inch. The proximate sidewall 708 can be in communication with and extend between the proximate lip 700 and the depression 712. The distal sidewall 710 can be in communication with and extend between the distal lip 702 and the depression 712.

The fluid channel 116 can define various cross-sectional shapes. As best illustrated in FIG. 7A, in one embodiment, the fluid channel 116 can generally define a U-shaped cross-section, such that the upper fluid channel width $W_{UFC}$ and the lower fluid channel width $W_{LFC}$ are generally corresponding or equal. As best illustrated in FIG. 7B, in another embodiment, the fluid channel 116 can define a cross-sectional shape defined by a generally vertical proximate sidewall 708 and a sloped distal sidewall 710, such that the upper fluid channel width $W_{UFC}$ is generally greater than the lower fluid channel width $W_{LFC}$. The slope of the sloped distal sidewall 710, relative to a horizontal axis (not shown), can be between approximately five (5) degrees and ninety (90) degrees. In another embodiment, the slope of the sloped distal sidewall 710 can be between approximately twenty-five (25) degrees and seventy (70) degrees. In yet another embodiment, the slope of the sloped distal sidewall 710 can be approximately thirty (30) degrees. However, it understood that the fluid channel 116 can define any suitable symmetrical or nonsymmetrical shape, including, without limitation, a V-shaped cross-section, a W-shaped cross-section, and so on.

As best illustrated in FIG. 8, the at least one continuous lateral member 110 can define a height $H_{CLM}$. In one embodiment, the height $H_{CLM}$ can be between approximately one-quarter (0.25) inch and two (2) inches. In another embodiment, the height $H_{CLM}$ can be between approximately one-half (0.5) inch and one and one-half (1.5) inches. In yet another embodiment, the height $H_{CLM}$ can be approximately one (1) inch. The at least one continuous lateral member 110 can define an effective cross-section corresponding with the height $H_{CLM}$ and the depth $D_{CLM}$. In one embodiment, the effective cross-section of the at least one continuous lateral member 110 can be generally square. However, it will be understood that the effective cross-section of the at least one continuous lateral member 110 can be any suitable symmetrical or nonsymmetrical geometrical shape, including, without limitation, a square and so on.

Figure 10:
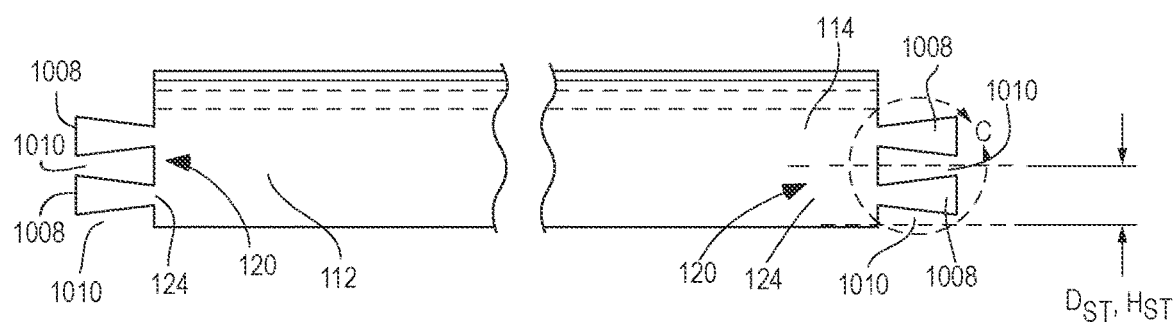
FIG. 10 is a front elevation view of a second lateral member of a drainage apparatus in accordance with one embodiment of the present invention.
Figure 11A:
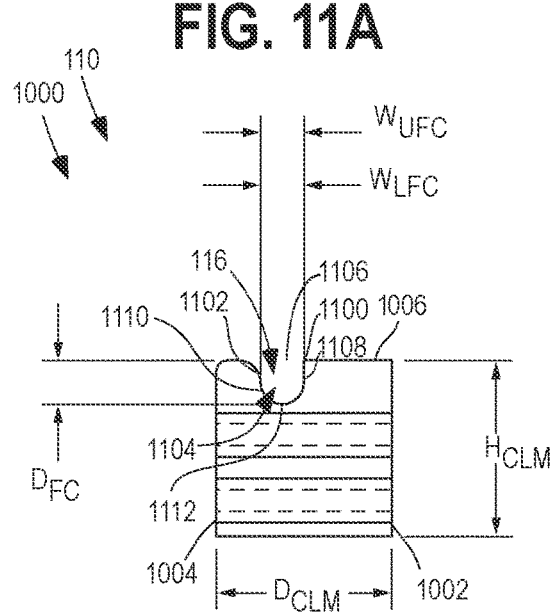
FIG. 11A is a first side elevation view of the second lateral member of FIG. 10.
Figure 11B:
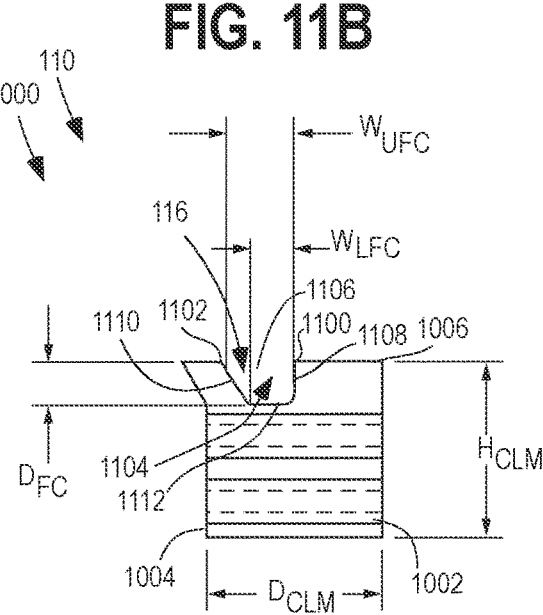
FIG. 11B is a first side elevation view of the second lateral member of FIG. 10.
Figure 12:
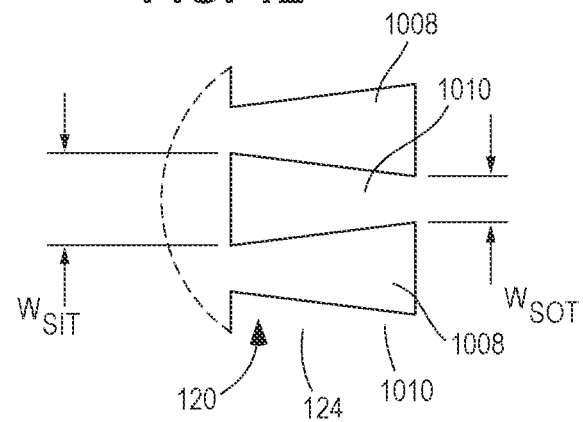
FIG. 12 is a detail view of a connection element of the second lateral member of FIGS. 10 and 11, taken along view line C-C of FIG. 10.

FIGS. 10-12 depict a second continuous lateral member 1000. Such second continuous lateral member 1000 can correspond with the width or widths of the drainage apparatus 100. As best illustrated in FIGS. 11A and 11B, the second continuous lateral member 1000 can define a fluid channel 116 and generally comprise a proximate vertical edge 1002, a distal vertical edge 1004, and a generally planar or mostly flat upper surface 1006. The upper surface 1006 can be adjacent the proximate vertical edge 1002 and/or the distal vertical edge 1004. As best illustrated in FIGS. 11A and 11B, the fluid channel 116 can comprise a proximate rim or lip 1100, a distal rim or lip 1102, and a gutter 1104. The upper surface 1006 can be located proximate the proximate lip 1100, the distal lip 1102, and/or the gutter 1104, as shown in FIGS. 11A and 11B. The gutter 1106 can comprise a proximate sidewall 1108 and a distal sidewall 1110. In one embodiment, the proximate lip 1100 can form hard edges or right angles. As best illustrated in FIG. 11A, in another embodiment, the distal lip 1102 can be rounded, chamfered, or beveled. As best illustrated in FIG. 11B, in yet another embodiment, the distal lip 1102 can form an obtuse-angled edge. However, it will be understood that the proximate lip 1100 and/or the distal lip 1102 can form any edge or assume any suitable shape. As best illustrated in FIGS. 11A and 11B, the proximate lip 1100 and the distal lip 1102 can define a gap 1106. The gap 1106 can define an upper fluid channel width $W_{UFC}$. In one embodiment, the upper fluid channel width $W_{UFC}$ can be between approximately one-sixteenth (0.0625) inch and two (2) inches. In another embodiment, the upper fluid channel width $W_{UFC}$ can be between approximately one-eighth (0.125) inch and one (1) inch. In yet another embodiment, the upper fluid channel width $W_{UFC}$ can be approximately one-quarter (0.25) inch. As further illustrated in FIGS. 11A and 11B, the proximate sidewall 1108 and the distal sidewall 1110 can define a lower fluid channel width $W_{LFC}$. In one embodiment, the lower fluid channel width $W_{LFC}$ can be between approximately one-sixteenth (0.0625) inch and two (2) inches. In another embodiment, the lower fluid channel width $W_{LFC}$ can be between approximately one-eighth (0.125) inch and one (1) inch. In yet another embodiment, the lower fluid channel width $W_{LFC}$ can be approximately one-quarter (0.25) inch.

The gutter 1104 of the fluid channel 116 can comprise a depression 1112 extending downward from and in communication with the gap 1106. The gap 1106 and the depression 1112 can define a fluid channel depth $D_{FC}$. In one embodiment, the fluid channel depth $D_{FC}$ can be between approximately one-sixteenth (0.0625) inch and two (2) inches. In another embodiment, the fluid channel depth $D_{FC}$ can be between approximately one-eighth (0.125) inch and one (1) inch. In yet another embodiment, the fluid channel depth $D_{FC}$ can be approximately one-quarter (0.25) inch. The proximate sidewall 1108 can be in communication with and extend between the proximate lip 1100 and the depression 1112. The distal sidewall 1110 can be in communication with and extend between the distal lip 1102 and the depression 1112.

The fluid channel 116 can define various cross-sectional shapes. As best illustrated in FIG. 11A, in one embodiment, the fluid channel 116 can generally define a U-shaped cross-section, such that the upper fluid channel width $W_{UFC}$ and the lower fluid channel width $W_{LFC}$ are generally corresponding or equal. As best illustrated in FIG. 11B, in another embodiment, the fluid channel 116 can define a cross-sectional shape defined by a generally vertical proximate sidewall 1108 and a sloped distal sidewall 1110, such that the upper fluid channel width $W_{UFC}$ is generally greater than the lower fluid channel width $W_{LFC}$. The slope of the sloped distal sidewall 1110, relative to a horizontal axis (not shown), can be between approximately five (5) degrees and ninety (90) degrees. In another embodiment, the slope of the sloped distal sidewall 1110 can be between approximately twenty-five (25) degrees and seventy (70) degrees. In yet another embodiment, the slope of the sloped distal sidewall 1110 can be approximately thirty (30) degrees. However, it understood that the fluid channel 116 can define any suitable symmetrical or nonsymmetrical shape, including, without limitation, a V-shaped cross-section, a W-shaped cross-section, and so on.

The gutters 704, 1104 can be adapted to urge or force fluids, liquids, or juices through the fluid channel 116 in a predetermined direction. Such management of the fluids, liquids, or juices can be achieved by providing a slope in the gutters 704, 1104 or the depressions 708, 1112 over the fluid channel length. In one embodiment, the gutters 704, 1104 or the depressions 708, 1112 can define a high point generally located at the center point of the of the fluid channel length, such that the gutters 704, 1104 or the depressions 708, 1112 generally slope downward toward each of the first end point 112 and the second end point 114 of the at least one continuous lateral member 110. In another embodiment, the gutters 704, 1104 or the depressions 708, 1112 can define a high point generally located at one of either the first end point 112 or the second end point 114 of the at least one continuous lateral member 110, such that the gutters 704, 1104 or the depressions 708, 1112 generally slope downward toward the opposing second end point 114 or first end point 112 of the at least one continuous lateral member 110.

In one embodiment, the bearing surface 130 can be adapted for receiving a cutting surface (not shown), including, without limitation, a cutting board. Such cutting surface can be of various sizes and shapes. The cutting surface can be coupled to the fluid channel 116. In operation, a cutting surface can be provided, coupled, and placed to bear upon the bearing surface 130. A cutting surface, of various sizes and shapes, can be securely coupled to the bearing surface 130 to allow for safe and effective use of the cutting surface. The planar profile of the cutting surface can be generally smaller than, corresponding to, or larger than the rectangularly planar profile of the bearing surface 130. In one embodiment, the bearing surface 130 can be adapted for supporting a cutting surface so that the cutting surface is coupled to the fluid channel 116.

In one embodiment, the cutting surface can be in fluid communication with the bearing surface 130, which can be in fluid communication with the fluid channel 116, such that any fluid, liquid, or juice created from the use of the cutting surface can naturally travel from the cutting surface, over the bearing surface 130, and into the fluid channel 116. In another embodiment, the cutting surface can be in direct fluid communication with the fluid channel 116, such that any fluid, liquid, or juice created from the use of the cutting surface can naturally travel from the cutting surface into the fluid channel 116. In such embodiment, the cutting surface can be supported by the bearing surface 130 such that at least one edge of the cutting surface can generally vertically align with a distal lip 702, 1102 of the fluid channel 116. However, it will be understood that the cutting surface can be adapted and coupled to the bearing surface 130 so that more than one edge of the cutting surface can generally vertically align with the distal lip 702, 1102 of the fluid channel 116. Therefore, when fluid, liquid, or juice travels from the cutting surface to the fluid channel 116, the fluid, liquid, or juice can fall directly into the gap 706, 1106 of the fluid channel 116 through gravitational forces. Alternatively, the fluid, liquid, or juice can travel from the cutting surface to the fluid channel 116 and indirectly travel into the gap 706, 1106 of the fluid channel 116 by clinging to a surface of the cutting surface and/or the bearing surface 130 under the general influence of surface tension forces. In one embodiment, the surface of the cutting surface and/or the bearing surface 130 over which the fluid, liquid, or juice can indirectly travel into the gap 706, 1106 can be treated in a manner that the surface tension forces are suitably altered for the use of the drainage apparatus 100, including enhancing the surface tension effects of the surface. Use of surface tension forces allows for cutting surfaces to be used that have larger planar profiles than a planar profile defined by a continuous unitary fluid channel 116 of the drainage apparatus 100.

In another embodiment, the pedestal 150 can define a recess (not shown). The recess can define a cross-section. The cross-section of the recess can generally correspond with the effective cross-section of the first continuous lateral member 500 and/or the second continuous lateral member 1000, such that the recess can receive the first continuous lateral member 500 and/or the second continuous lateral member 1000. In one embodiment, the recess can be located on the sides of the drainage apparatus 100 or laterally adjacent to the bearing surface 130. In such embodiment, the first continuous lateral member 500 and/or the second continuous lateral member 1000 can be received in the sides of the drainage apparatus 100, such that the fluid channel 116 can collect, retain, and manage fluids, liquids, or juices without reducing the effective bearing area of the bearing surface 130 or the effective cutting area of any surface coupled therewith. In one embodiment, the recess can define a generally square cross-section. Where the pedestal 150 is comprised of wood or wood-like material, the recess can be machined or milled into the pedestal 150 to create a dado or a groove. The recess can comprise a through dado or groove or a stopped dado or groove. In another embodiment, where the pedestal 150 is comprised of synthetic material, including moldable plastics, the recess can be molded or formed into the pedestal 150.

In another embodiment, the at least one continuous lateral member 110 can define the bearing surface 130. In such embodiment, a portion of the upper surface 506, 1006 of the at least one continuous lateral member 110 may define the bearing surface 130. In one embodiment, The upper surface 506, 1006 and the bearing surface 130 defined thereby can be located proximate the proximate lip 700, 1100, the distal lip 702, 1102, and/or the gutter 704, 1104 of at least one continuous lateral member 110. However, it will be understood that nearly any portion or amount of the upper surface 506, 1006 of the at least one continuous lateral member 110 can define the bearing surface 130. In another embodiment, where the drainage apparatus 100 comprises four continuous lateral members 110, the four continuous lateral members 110 can together define a common, unitary bearing surface 130. In such embodiment, the four continuous lateral members 110 can define separate upper surfaces 506, 1006 and can be connected so that the combination can form the bearing surface 130. In another embodiment, the four continuous lateral members 110 can define a void (not shown) located between the continuous lateral members 110 and about a shared axial center point defined by the continuous lateral members 110, such that the four continuous lateral members 110 generally form a hollow square or rectangle when viewed from above. Such void can remain empty during operation, or a separate pedestal 150 can be provided within the void to provide an additional bearing surface 130 for the drainage apparatus 100.

As shown in FIGS. 5-12, in one embodiment, the connection element 120 can comprise a dovetail connection joint 124. The dovetail connection joint 124 can be adapted to sealingly connect a continuous lateral member 110 to itself or to another continuous lateral member or members 110. In one embodiment, the dovetail connection joint 124 can generally connect a first continuous lateral member 500 and a second continuous lateral member 1000.

Figure 9:
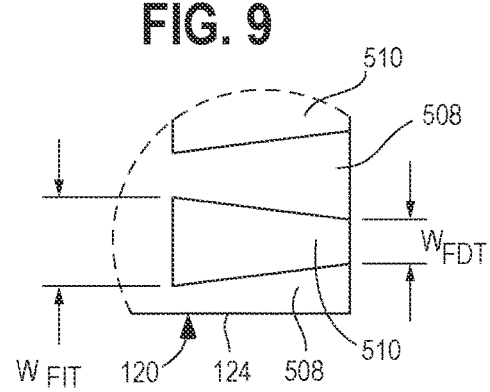
FIG. 9 is a detail view of a connection element of the first lateral member of FIGS. 5-8, taken along view line B-B of FIG. 8.

As best illustrated in FIG. 6, the first continuous lateral member 500 can comprise a plurality of first pins 508 extending from an end point 112, 114 of the first continuous lateral member 500. As shown in FIGS. 8 and 9, the plurality of first pins 508 can define a plurality of first voids or tails 510. As best illustrated in FIG. 10, in another embodiment, the second continuous lateral member 1000 can comprise a plurality of second pins 1008 extending from an end point 112, 114 of the second continuous lateral member 1000. As best shown in FIG. 12, the plurality of second pins 1008 can define a plurality of second voids or tails 1010. To effectively mate the first continuous lateral member 500 with the second continuous lateral member 1000, the first tails 510 can be adapted to receive the second pins 1008, and/or the second tails 1010 can be adapted to receive the first pins 508. In one embodiment, the pins 508, 1008 and the tails 510, 1010 can define corresponding generally trapezoidal shapes. However, it will be understood that the pins 508, 1008 and the tails 510, 1010 can define any suitable shape.

As best illustrated in FIG. 8, the first tails 510 can be separated by a first tail distance $D_{FT}$. In one embodiment, the first tail distance $D_{FT}$ can be between approximately one-eighth (0.125) inch and one (1) inch. In another embodiment, the first tail distance $D_{FT}$ can be between approximately one-quarter (0.25) inch and one-half (0.5) inch. In yet another embodiment, the first tail distance $D_{FT}$ can be approximately three-eighths (0.375) inch. As further illustrated in FIG. 8, the first tails 510 can be located at a first tail height $H_{FT}$ above the bottommost portion of the first continuous lateral member 500. In one embodiment, the first tail height $H_{FT}$ can be between approximately one-sixteenth (0.0625) inch and one (1) inch. In another embodiment, the first tail height $H_{FT}$ can be between approximately one-eighth (0.125) inch and one-half (0.5) inch. In yet another embodiment, the first tail height $H_{FT}$ can be approximately seven-thirty-seconds (0.21875) inch. As best illustrated in FIG. 9, each of the first tails 510 can define a first outer tail width $W_{FOT}$ and a first inner tail width $W_{FIT}$. In one embodiment, the first outer tail width $W_{FOT}$ can be between approximately one-sixteenth (0.0625) inch and one-quarter (0.25) inch. In another embodiment, the first outer tail width $W_{FOT}$ can be approximately one-eighth (0.125) inch. In one embodiment, the first inner tail width $W_{FIT}$ can be between approximately one-eighth (0.125) inch and one-half (0.5) inch. In another embodiment, the first inner tail width $W_{FIT}$ can be approximately one-quarter (0.25) inch.

As best illustrated in FIG. 10, the second tails 1010 can be separated by a second tail distance $D_{ST}$. In one embodiment, the second tail distance $D_{ST}$ can be between approximately one-eighth (0.125) inch and one (1) inch. In another embodiment, the second tail distance $D_{ST}$ can be between approximately one-quarter (0.25) inch and one-half (0.5) inch. In yet another embodiment, the second tail distance $D_{ST}$ can be approximately three-eighths (0.375) inch. As further illustrated in FIG. 10, the second tails 1010 can be located at a second tail height $H_{ST}$ above the bottommost portion of the second continuous lateral member 1000. In one embodiment, the second tail height $H_{ST}$ can be between approximately one-eighth (0.125) inch and one (1) inch. In another embodiment, the second tail height $H_{ST}$ can be between approximately one-quarter (0.25) inch and one-half (0.5) inch. In yet another embodiment, the second tail height $H_{ST}$ can be approximately three-eighths (0.375) inch. As best illustrated in FIG. 12, each of the second tails 1010 can define a second outer tail width $W_{SOT}$ and a second inner tail width $W_{SIT}$. In one embodiment, the second outer tail width $W_{SOT}$ can be between approximately one-sixteenth (0.0625) inch and one-quarter (0.25) inch. In another embodiment, the second outer tail width $W_{SOT}$ can be approximately one-eighth (0.125) inch. In one embodiment, the second inner tail width $W_{SIT}$ can be between approximately one-eighth (0.125) inch and one-half (0.5) inch. In another embodiment, the second inner tail width $W_{SIT}$ can be approximately one-quarter (0.25) inch.

In one embodiment, the first pins 508 can be joined to the second pins 1008 through the use of glue or similar adhesives. However, it will be understood that the first pins 508 can be joined to the second pins 1008 through the use of any suitable fastening means, including, without limitation, any other suitable adhesives, bolts, screws, pins, clamping members, any other suitable fastening means, whether presently known or later developed, and any combination thereof.

In another embodiment, the connection element 120 can comprise an adjustable latch (not shown). The adjustable latch can be selectively movable between a first position and a second position. In one embodiment, where the adjustable latch is in the first position, the adjustable latch can sealingly connect a continuous lateral member 110 to itself, to another continuous lateral member or members 110, or to another object or other objects. In another embodiment, where the adjustable latch is in the second position, the adjustable latch can release the continuous lateral member 110 from any sealing connection. In one embodiment, the latch can be a t-handle latch, including a flexible t-handle latch. In another embodiment, at least three of the connection elements 120 can each comprise a dovetail connection joint 124. In yet another embodiment, at least one of the connection elements 120 can each comprise an adjustable latch.

As further set forth herein, another embodiment is directed to a cutting board system that is adapted for removing fluids, liquids, or juices from a cutting surface. Referring to the figures, illustrated is a cutting board system comprising a drainage apparatus that is capable of removing fluids, liquids, or juices without reducing the effective cutting area of the cutting surface.

Figure 13:
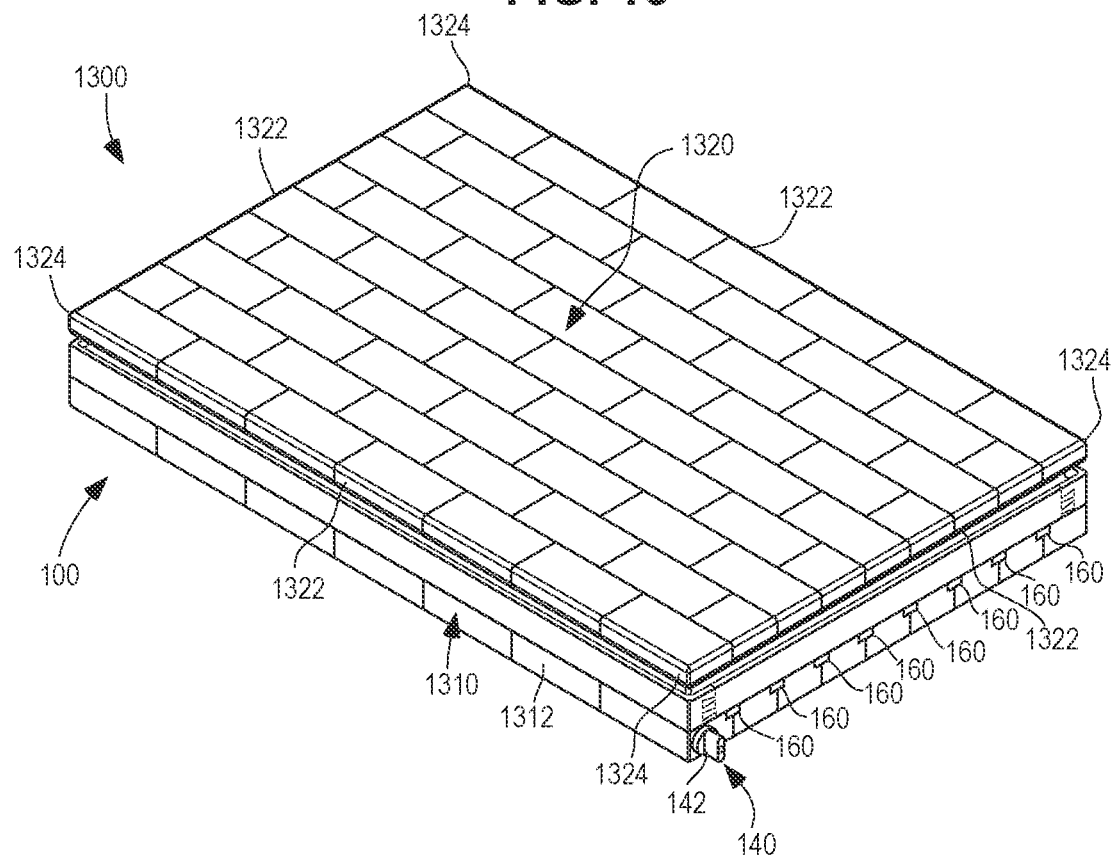
FIG. 13 is a perspective view of a cutting board system in accordance with one embodiment of the present invention.

As represented in FIGS. 13-18, in yet another embodiment, the cutting board system 1300 can comprise a cutting board body 1310, a cutting surface 1320, at least one sloped surface 1500, and a drainage apparatus 100, as described herein. As best illustrated in FIG. 13, in one embodiment, the cutting board system 1300 can generally define a rectangular prism. In one embodiment, the cutting board system 1300 can have height of approximately three (3) inches, a width of approximately fourteen and five eights (14.625) inches, and a length of approximately twenty-two and third quarters (22.75) inches. As further shown in FIG. 13, the cutting board body 1310 can comprise a base member 1312. The base member 1312 can define a height (not shown). In one embodiment, the height of the base member 1312 can be between approximately one-quarter (0.25) inch and twelve (12) inches. In another embodiment, the height of the base member 1312 be between approximately one-third (0.333) inch and two (2) inches. In yet another embodiment, the height of the base member 1312 can be approximately one (1) inch. In even yet another embodiment, the height of the base member 1312 can be approximately one-half (0.5) inches. In one embodiment, the cutting board body 1310 and/or the base member 1312 can be comprised of wood, including, without limitation, maple, walnut, cherry, beech, teak, bamboo, any other suitable wood or wood-like material, whether presently known or later developed, and any combination thereof. In another embodiment, the cutting board body 1310 and/or the base member 1312 can be comprised of a plastic, including, without limitation, PE, HDPE, any other suitable plastic, whether presently known or later developed, and any combination thereof. It will be understood that the cutting board body 1310 and/or the base member 1312 can be comprised of any suitable combination of wood or wood-like materials, plastics, and/or any other suitable materials.

In one embodiment, as best illustrated in FIG. 13, the cutting board body 1310 can define the cutting surface 1320. The cutting surface 1320 can be coupled to a fluid channel 116. The cutting surface 1320 can comprise a plurality of side edges 1322 and a plurality of corners 1324. In one embodiment, the cutting surface 1320 can comprise four (4) side edges 1322 and four corners 1324. However, it will be understood that the cutting surface 1320 can comprise any number of side edges 1322 and corners 1324. Additionally, although the cutting surface 1320 is depicted as being generally rectangular, it will be understood that the cutting surface 1320 can assume any suitable symmetrical or non-symmetrical geometrical shape, including, without limitation, a square, a pentagon, a hexagon, and so on.

In one embodiment, the cutting surface 1320 can be generally planar or mostly flat. In another embodiment, the cutting surface 1320 can be generally rounded or define a slight grade or incline. The rounded nature or grade of the cutting surface 1320 can comprise a high point generally located at the center point of the cutting surface 1320, such that the cutting surface 1320 generally slopes downward toward each side edge 1322 and corner 1324 of the cutting surface 1320. In another embodiment, the high point of the cutting surface 1320 can be generally located at one side edge 1322 or corner 1324 of the cutting surface 1320, such that the cutting surface 1320 generally slopes downward toward the laterally adjacent and/or opposing side edges 1322 and corners 1324 of the cutting surface 1320.

In one embodiment, the cutting surface 1320 can be comprised of wood, including, without limitation, maple, walnut, cherry, beech, teak, bamboo, any other suitable wood or wood-like material, whether presently known or later developed, and any combination thereof. In another embodiment, where the cutting surface 1320 is comprised of wood, the cutting surface 1320 can comprise pieces of wood arranged in an edge-grain orientation such that the edge of the pieces of wood are assembled together. As best illustrated in FIG. 14, in yet another embodiment, where the cutting surface 1320 is comprised of wood, the cutting surface 1320 can comprise pieces of wood arranged in an end-grain orientation such that the ends of the pieces of wood are assembled together. In one embodiment, the cutting surface 1320 can be comprised of a plastic, including, without limitation, PE, HDPE, any other suitable plastic, whether presently known or later developed, and any combination thereof. It will be understood that the cutting surface 1320 can be comprised of any suitable combination of wood or wood-like material, plastics, and/or any other suitable materials.

In yet another embodiment, the cutting board system 1300 can further comprise a structural support 160. The structural support 160 can be coupled to the cutting surface 1320. In one embodiment, the structural support 160 can be coupled to the cutting surface 1320 in a horizontally longitudinal orientation. In another embodiment, the structural support 160 can be coupled to the cutting surface 1320 in a horizontally transverse orientation. However, it will be understood that the structural support 160 can be coupled to the cutting surface 1320 in any suitable manner to provide the necessary reinforcement. In one embodiment, the structural support 160 can be provided separate from a cutting board body 1310. In such embodiment, the structural support 160 can be removably coupled to the cutting surface 1320. However, it will be understood that the structural support 160 can be affixedly attached to the cutting surface 1320. In another embodiment, the structural support 160 can be integrally formed with the cutting board body 1310. For example, in one embodiment, the structural support 160 can be received within the cutting board body 1310 in recesses created during the manufacture of the cutting board body 1310. The cross-section of such recesses can generally correspond with the effective cross-section of the structural support 160, such that the recesses can receive the structural support 160. Where the cutting board body 1310 is comprised of wood or wood-like material, the recesses can be machined or milled into the cutting board body 1310 or individual elements comprising the cutting board body, including without limitation, staves, to create a dado to create a dado or a groove. The recesses can comprise a through dado or groove or a stopped dado or groove. In another embodiment, the recesses can be formed by drilling holes into the wood or wood-like material of the cutting board body 1310. Where the cutting board body 1310 is comprised of synthetic material, including moldable plastics, the recesses can be molded or formed into the cutting board body 1310. The structural support 160 can placed within the recesses of the cutting board body 1310, within the recesses of the individual elements comprising the cutting board body 1310, or between the individual elements comprising the cutting board body 1310 as the cutting board body 1310 is being manufactured.

In one embodiment, the structural support 160 can be coupled or joined to the cutting board body 1310 through the use of glue or similar adhesives. However, it will be understood that the structural support 160 can be joined to the cutting board body 1310 through the use of any suitable fastening means, including, without limitation, any other suitable adhesives, bolts, screws, pins, clamping members, any other suitable fastening means, whether presently known or later developed, and any combination thereof.

The at least one sloped surface 1500 of the cutting board system 1300 can be in fluid communication with a cutting surface 1320. In one embodiment, as best illustrated in FIGS. 15A and 15B, the at least one sloped surface 1500 can extend between at least one side edge 1322 of the cutting surface 1320 and the proximate lip 700, 1100 of the fluid channel 116 and generally define a back slope. However, it will be understood that the at least one sloped surface 1500 can define a front slope or any other suitable slope, including a perpendicular surface with no slope. As further illustrated in FIGS. 15A and 15B, in one embodiment, the at least one sloped surface 1500 can be located below or at a lesser elevation than the cutting surface 1320. As further illustrated in FIGS. 15A and 15B, in another embodiment, the sloped surface 1500 can be located above or at a greater elevation than the fluid channel 116.

The at least one sloped surface 1500 can define a slope relative to a horizontal axis (not shown) of the cutting board system 1300. In one embodiment, the slope of the at least one sloped surface 1500 can be between approximately five (5) degrees and ninety (90) degrees. In another embodiment, the slope of the at least one sloped surface 1500 can be between approximately twenty (20) degrees and seventy-five (70) degrees. In yet another embodiment, the slope of the at least one sloped surface 1500 can be approximately thirty (30) degrees. In even yet another embodiment, the slope of the at least one sloped surface 1500 can be approximately sixty (60) degrees. As best illustrated in FIG. 15B, in one embodiment, the sloped surface 1500 can be generally parallel to a sloped distal sidewall 710, 1110 of a fluid channel 116.

As best illustrated in FIGS. 15A and 15B, in one embodiment, the cutting surface 1320 can be in direct fluid communication with the fluid channel 116, such that any fluid, liquid, or juice created from the use of the cutting surface can naturally travel from the cutting surface into the fluid channel 116. In such embodiment, at least one side edge 1322 of the cutting surface 1320 can generally vertically align with a distal lip 702, 1102 of the fluid channel 116. However, it will be understood that the cutting surface 1320 can be adapted so that more than one side edge 1322 of the cutting surface 1320 can generally vertically align with the distal lip 702, 1102 of the fluid channel 116. Therefore, when fluid, liquid, or juice travels from the cutting surface 1320 to the fluid channel 116, the fluid, liquid, or juice can fall directly into the gap 706, 1106 of the fluid channel 116 through gravitational forces. Alternatively, the fluid, liquid, or juice can travel from the cutting surface 1320 to the fluid channel 116 and indirectly travel into the gap 706, 1106 of the fluid channel 116 by clinging to a surface of the cutting surface 1320, at least one side edge 1322, and/or the at least one sloped surface 1500 generally under the influence of surface tension forces. In one embodiment, the surface of the cutting surface 1320, at least one side edge 1322, and/or the at least one sloped surface 1500 can be treated in a manner that the surface tension forces are suitably altered for the use of the cutting board system 1300, including enhancing the surface tension effects of the surface.

In one embodiment, as shown in FIG. 15A, the side edge 1322 of the cutting surface 1320 can correspond with and be in direct vertical alignment with the distal lip 702, 1102 of the fluid channel 116. In such embodiment, the fluid, liquid, or juice can primarily travel from the cutting surface 1320 to the fluid channel 116, and travel into the gap 706, 1106 of the fluid channel 116, by falling from the cutting surface 1320 generally under the influence of gravity and clinging to the generally vertical side edge 1322 generally under the influence of surface tension forces, before ending in the gap 706, 1106. In this arrangement, the cutting board system 1300 can function to collect, maintain, and manage the fluid, liquid, or juice that may gather on the cutting surface 1320 during use.

In another embodiment, as shown in FIG. 15B, the side edge 1322 of the cutting surface 1320 can be generally vertically aligned with the distal lip 702, 1102 of the fluid channel 116 and be located generally proximate the distal lip 702, 1102. In such embodiment, the fluid, liquid, or juice can primarily travel from the cutting surface 1320 to the fluid channel 116, and directly travel into the gap 706, 1106 of the fluid channel 116, by falling from the cutting surface 1320 past the side edge 1322 and into the gap 706, 1106 generally under the influence of gravity. As shown in FIG. 15B, the distal lip 702, 1102 can extend beyond or be located generally distal the side edge 1322 of the cutting surface 1320, which can aid the gap 706, 1106 in collecting fluid, liquid, or juice, including increased volumes thereof, from the cutting surface 1320. In this arrangement, the cutting board system 1300 can function to collect, maintain, and manage the fluid, liquid, or juice that may gather on the cutting surface 1320 during use.

However, it will be understood that the side edge 1322 of the cutting surface 1320 can be generally vertically aligned with the distal lip 702, 1102 of the fluid channel 116 and extend beyond or be located generally distal the distal lip 702, 1102. In such embodiment, the fluid, liquid, or juice can primarily travel from the cutting surface 1320 to the fluid channel 116, and indirectly travel into the gap 706, 1106 of the fluid channel 116, by clinging to the at least one sloped surface 1500 generally under the influence of surface tension forces. By primarily relying on the at least one sloped surface 1500 as the conduit between the cutting surface 1320 and the fluid channel 116, where the side edge 1322 of the cutting surface 1320 extends beyond or is located generally distal the distal lip 702, 1102, the cutting board system 1300 can function to collect, maintain, and manage the fluid, liquid, or juice while simultaneously separating the same from any foodstuffs or solid objects that may gather on the cutting surface 1320 during use. This has the advantage of rendering the fluid channel 116 generally free of foodstuffs or other solid objects that could otherwise generally inhibit the free flow of the fluid, liquid, or juice therethrough and limit the effectiveness of the cutting board system 1300.

Figure 17:
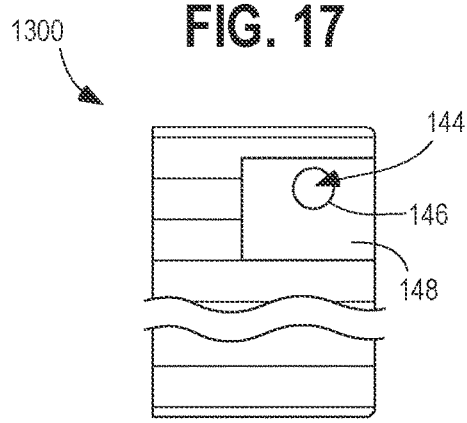
FIG. 17 is a partial cross-section view of the cutting board system of FIGS. 13-16, taken along view line E-E of FIG. 16.

In one embodiment, the drainage apparatus 100 of the cutting board system 1300 can comprise a drainage device 140. The drainage device 140 can further comprise a drainage tube 144. As best illustrated in FIG. 17, the drainage tube 144 can comprise a first end (not shown) and a second end 146. The first end and the second end 146 can define a cylindrical void. The drainage tube 144 can be in fluid communication with a fluid channel (not shown). In one embodiment, the first end can be connected to and in fluid communication with the fluid channel. Further, the second end 146 of such embodiment can define an opening in an outer portion of the drainage apparatus 100, such that the fluid channel can be in fluid communication with an outer portion of the drainage apparatus 100 and/or the cutting board system 1300 via the drainage tube 144. In another embodiment, the second end 146 of the drainage tube 144 can be located on the bottom of the drainage apparatus 100 and/or the cutting board system 1300. As best illustrated in FIG. 17, in one embodiment, the drainage apparatus 100 can comprise a void 148 within the drainage tube 144 to receive and locate the drainage valve 142. In another embodiment, the drainage valve 142 can be located adjacent either the first end or the second 146 of the drainage tube 144.

The drainage valve 142 can be selectively movable between a first position and a second position. In one embodiment, the drainage valve 142 can be selectively moved from the first position to the second position to allow for the free flow of fluid through the drainage tube 144. Similarly, the drainage valve 142 can be selectively moved from the second position to the first position to cease the free flow of fluid through the drainage tube 144.

In one embodiment, the drainage valve 142 can comprise a generally linear through-bore (not shown) oriented generally perpendicular to the longitudinal axes of the drainage valve 142. In such embodiment, the drainage valve 142 can be selectively rotatingly moved from the first position to the second position by selectively rotating the drainage valve 142 along its longitudinal axis. By selectively rotatingly moving the drainage valve 142 from the first position to the second position, the through-bore can align with and be in fluid communication with the drainage tube 144 to permit the free flow of fluid through the drainage tube 144. The drainage valve 142 can be selectively rotatingly moved from the first position to the second position by selectively rotating the drainage valve 142 ninety (90) degrees about its longitudinal axis. However, it will be understood that the drainage valve 142 can be adapted to selectively rotate any number of degrees to move between the first position and the second position. The drainage valve 142 can be selectively rotatingly moved from the second position to the first position in a similar manner.

In another embodiment, the drainage valve 142 can be selectively pullingly moved from the first position to the second position by selectively pulling the drainage valve 142 at least partially from the within the drainage tube 144 or from its location adjacent either the first end or the second end 146 of the drainage tube 144. It will be understood that the drainage valve 142 can be selectively pullingly moved from the first position to the second position by at least partially selectively moving the drainage valve 142 from the within the drainage tube 144 or from its location adjacent either the first end or the second 144 of the drainage tube 144, by completely selectively removing the drainage valve 142 from the within the drainage tube 144 or from its location adjacent either the first end or the second end 146 of the drainage tube 144, or by selectively moving the drainage valve 142 any amount therebetween from the within the drainage tube 144 or from its location adjacent either the first end or the second end 146 of the drainage tube 144. The drainage valve 142 can be selectively pushingly moved from the second position to the first position in a similar manner.

In another embodiment, the drainage device 140 can further comprise a drainage reservoir (not shown). The drainage reservoir can generally define a confined void (not shown). The confined void can be in fluid communication with the drainage tube 144 and/or the drainage valve 142. The confined void can define a specified volume for storing a predetermined amount of fluid therein. In one embodiment, the specified volume can correspond with a predetermined amount of fluid associated with the amount of liquid generated from the daily amount of cut or processed food products resulting from residential and/or commercial use. However, it will be understood that the specified volume can correspond with a predetermined amount of fluid associated with the amount of liquid generated from any amount of use, including hourly, daily, weekly, or otherwise. The confined void can define a generally cuboid shape. However, it will be understood that the confined void can define any suitable shape capable of defining any specific volume.

Figure 18:
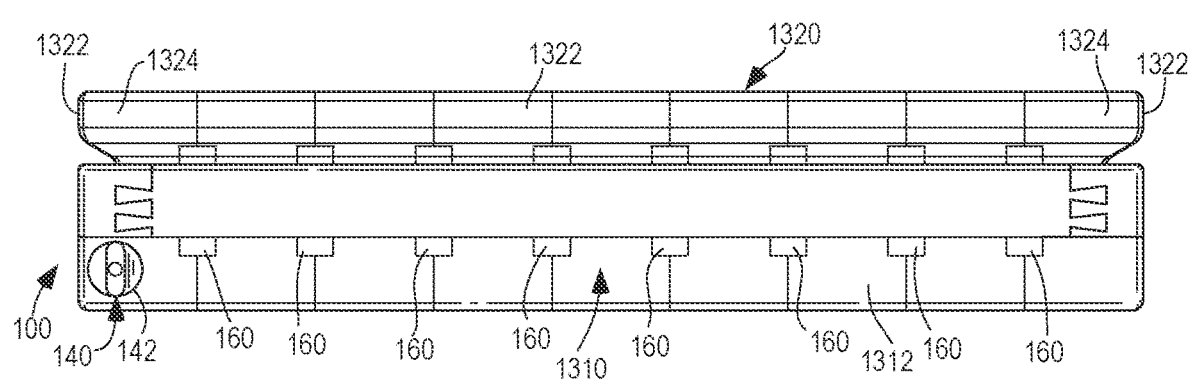
FIG. 18 is a side elevation view of the cutting board system of FIGS. 13-17.

As best illustrated in FIG. 18, the cutting board system 1300 can comprise a plurality of structural supports 160. In one embodiment, the structural supports 160 can be located within the cutting board system 1300 at regular distances or horizontal intervals. However, it will be understood that the structural supports 160 can be provided in any suitable manner.

As further set forth herein, another embodiment is directed to a cutting board system with a reinforcing system. Referring to the figures, illustrated is a reinforced cutting board system adapted to provide additional stability and longevity and reduces the risk of the cutting board system warping or splitting over time or after being subject to extended use. As described herein, the reinforcing system can comprise a series of additional elements coupled to the cutting board system to provide additional support. It will be understood that the reinforcing system described herein can be used in connection with the drainage apparatus and the cutting board system.

Figure 19:
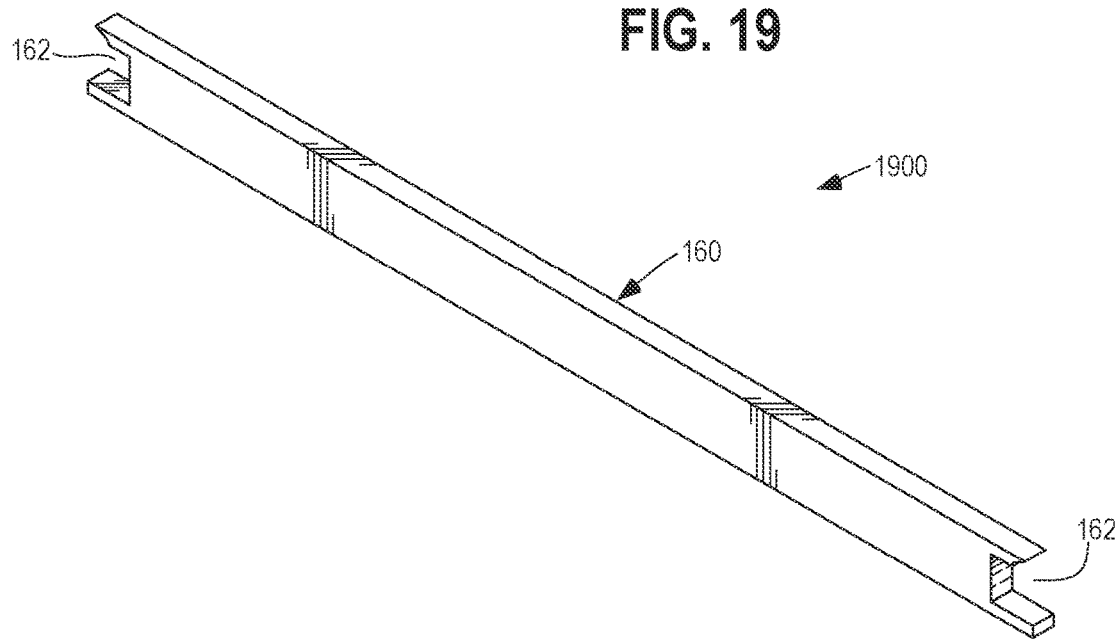
FIG. 19 is a perspective view of a structural support of a cutting board system in accordance with one embodiment of the present invention.
Figure 20:
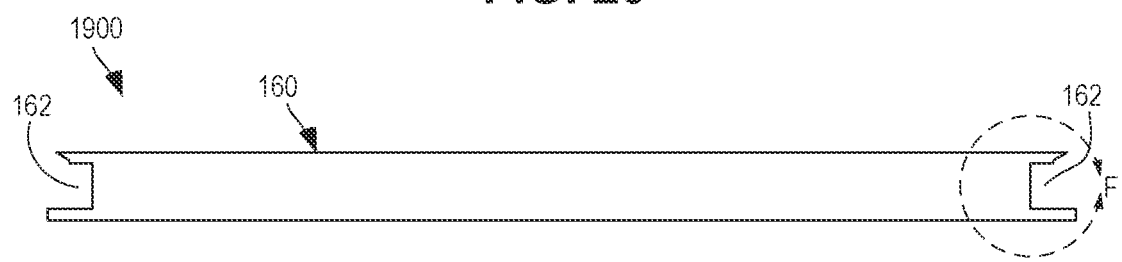
FIG. 20 is a front elevation view of the structural support of FIG. 19.
Figure 21:
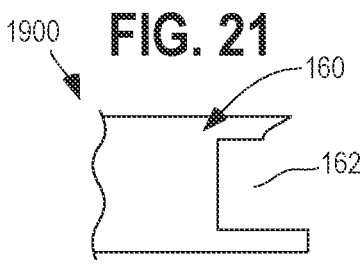
FIG. 21 is a detail view of an end portion of the structural support of FIGS. 19 and 20, taken along view line F-F of FIG. 20.
Figure 22:
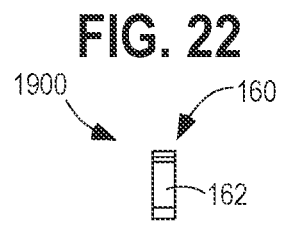
FIG. 22 is a side elevation view of the structural support of FIGS. 19-21.

In one embodiment, the reinforcing system 1900 can comprise structural supports 160. As best illustrated in FIGS. 19 and 20, the structural supports 160 can be generally rectangular in shape. In another embodiment, the structural supports 160 can be generally cylindrical in shape or comprise dowels or similar types of elements.

As shown in FIGS. 19-23, the structural supports 160 can define a recess 162. Where the structural supports 160 are comprised of wood or wood-like material, the recess 162 can be machined or milled into the structural supports 160. In one embodiment, the recess 162 can be machined or milled into the structural supports 160 after the structural supports 160 are coupled to the cutting board body, including after the structural supports 160 have been received within the cutting board body in recesses created during the manufacture of the cutting board body. In another embodiment, the recess 162 can be machined or milled into the structural supports 160 separately and before the structural supports 160 are coupled to the cutting board body. In yet another embodiment, where the structural supports 160 are comprised of synthetic material, including moldable plastics, the recess 162 can be molded or formed into the structural supports 160.

Figure 23:
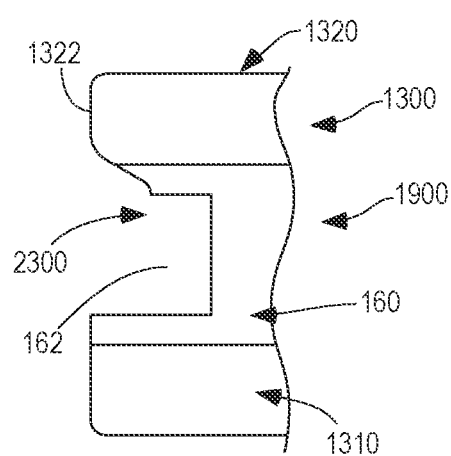
FIG. 23 is a detail cross-sectional view of a cutting board system in accordance with one embodiment of the present invention.

As best illustrated in FIG. 23, in one embodiment, the cutting board body 1310 can define a recess 2300. The recess 2300 can define a cross-section. The cross-section of the recess 2300 can generally correspond with the effective cross-section of the first continuous lateral member (not shown) and/or the second continuous lateral member (not shown), such that the recess 2300 can receive the first continuous lateral member and/or the second continuous lateral member. In one embodiment, the recess 2300 can be located on the sides of the cutting board body 1310 or laterally adjacent to the cutting surface 1320. In such embodiment, the first continuous lateral member and/or the second continuous lateral member can be received in the sides of the cutting board body 1310, such that the fluid channel (not shown) of the first continuous lateral member and/or the second continuous lateral member can collect, retain, and manage fluids, liquids, or juices without reducing the effective cutting area of the cutting surface 1320. In one embodiment, the recess 2300 can define a generally square cross-section. In another embodiment, where the cutting board body 1310 is comprised of wood or wood-like material, the recess 2300 can be machined or milled into the cutting board body 1310 to create a dado or a groove. The recess 2300 can comprise a through dado or groove or a stopped dado or groove. In another embodiment, where the cutting board body 1310 is comprised of synthetic material, including moldable plastics, the recess 2300 can be molded or formed into the cutting board body 1310. As best further illustrated in FIG. 23, the recess 162 of the structural supports can correspond with a recess 2300 of the cutting board body 1310.

In another embodiment, the at least one continuous lateral member (not shown) can be adapted for providing lateral support as part of the reinforcing system 1900. In one embodiment, the at least one continuous lateral member can be provided and received in the recess 2300 of the cutting board body 1310 and/or the recess 162 of the structural support 160. The at least one continuous lateral member can provide lateral support through compressive forces acting upon the cutting board body 1310. In another embodiment, the at least one continuous lateral member can provide lateral support through the tensile resistance of the at least one continuous lateral member.

In one embodiment, where the at least one continuous lateral member comprises two distinct materials used in combination, each material comprising the at least one continuous lateral member can serve to aid in providing lateral support. In one embodiment, where a metal or alloy is located at a proximate portion of the at least one continuous lateral member, the proximate portion of the at least one continuous lateral member can provide lateral support through the tensile resistance of the metal or alloy. In another embodiment, where a synthetic material is located at a distal portion of the at least one continuous lateral member, the distal portion of the at least one continuous lateral member can provide lateral support through compressive forces acting upon the cutting board body 1310 when the at least one continuous lateral member is secured into place, including through the use of a connection element (not shown) or latch, as described herein. In yet another embodiment, the proximate portion, comprising a metal or alloy, and the distal portion, comprising a synthetic material, can simultaneously provide lateral support in their respective manners.

In yet another embodiment, the reinforcing system 1900 can comprise reinforced structural substrate. In one embodiment, the base member 1312 of the cutting board body 1310 can comprise the reinforced structural substrate. The reinforced structural substrate can be configured to provide reinforcing support as part of the reinforcing system 1900. In one embodiment, structural elements (not shown) of the reinforced structural substrate can be arranged in a horizontally longitudinal orientation and horizontally transverse orientation to create a grid support system to provide a stiff base member 1312. In another embodiment, the structural elements of the reinforced structural substrate can be selectively intertwined or interlaced to create a weave-like pattern of structural elements to provide a stiff base member 1312. In yet another embodiment, where the base member 1312 is comprised of wood or wood-like material, the structural elements can comprise a cross-laminated substrate, including, without limitation, cross-laminated timber or wood.

As further set forth herein, in another embodiment, the drainage apparatus 100 and the cutting board system 1300 can further comprise a ventilation system (not shown) and feet members (not shown).

The ventilation system can comprise a plurality of voids (not shown) defined within a pedestal 150 of the drainage apparatus 100 or the cutting board body 1310 of the cutting board system 1300. The voids can define channels through the pedestal 150 of the drainage apparatus 100 or the cutting board body 1310 of the cutting board system 1300 to increase circulation in, around, and throughout the drainage apparatus 100 and the cutting board system 1300, respectively. Such increased circulation can be advantageous for maintaining the desired moisture content and temperature of the pedestal 150 of the drainage apparatus 100 or the cutting board body 1310 of the cutting board system 1300 for optimal use and longevity. The voids can assume a variety of shapes, including, without limitation, square-shape voids, rectangular-shape voids, circle-shape voids, and any other suitable shaped voids. The voids can further be provided in a grid-like pattern within the pedestal 150 of the drainage apparatus 100 or the cutting board body 1310 of the cutting board system 1300. Where the pedestal 150 of the drainage apparatus 100 or the cutting board body 1310 of the cutting board system 1300 are comprised of wood or wood-like material, the voids can be machined or milled into the pedestal 150 or the cutting board body 1310. In another embodiment, where the pedestal 150 of the drainage apparatus 100 or the cutting board body 1310 of the cutting board system 1300 are comprised of synthetic material, including moldable plastics, the voids can be molded or formed into the pedestal 150 or the cutting board body 1310.

The feet members (not shown) can be adapted to elevate the bottom portion of the drainage apparatus 100 or the cutting board system 1300 from a surface on which either is resting. Such feet members can provide air passageways underneath the drainage apparatus 100 or the cutting board system 1300 for increased circulation in and around the drainage apparatus 100 or the cutting board system 1300. Further, such feet members can ensure that the drainage apparatus 100 or the cutting board system 1300 does not come into contact with liquids or foodstuffs that are on the surface on which the drainage apparatus 100 or the cutting board system 1300 is resting.

As further set forth herein, the present invention also contemplates a method for making the cutting board system. According to one embodiment, the method for making the cutting board system described herein can generally comprise the steps of providing a suitable material, forming the desired shape of the cutting board system, curing the material, and providing a drainage apparatus.

As best illustrated in FIG. 24, the method for making the cutting board system 2400 can generally comprise several steps. As shown in Block 2410, the method for making the cutting board system 2400 can comprise the step of providing a suitable material. Suitable material for the cutting board system can include, without limitation, wood or wood-like material, whether presently known or later developed, plastic material, including, without limitation, PE, HDPE, any other suitable plastic material, whether presently known or later developed, and any combination thereof.

In one embodiment, the step of providing the suitable material can include the step of preparing the provided suitable materials into long rectangular prisms. In another embodiment, the step of providing the suitable material can include the step of providing a plurality of full-length pieces of pre-finished lumber, of a desired wood or wood-like material, that has been milled to a specified thickness. The pieces of pre-finished lumber can be further milled or processed to create full-length pieces of lumber of certain dimensions, such as 2×4 s and other long rectangular prisms.

As shown in Block 2420, the method for making the cutting board system 2400 can then comprise the step of curing the provided material. In one embodiment, this can be achieved through the use of a kiln. The provided material can be placed within a kiln according to predetermined parameters for adequate curing of the material. Such predetermined parameters can include temperature, time, pressure, additives, and other similar adjustable characteristics of the kiln. In one embodiment, this can include placing the material in a kiln more than once.

Then, as shown in Block 2430, the method for making the cutting board system 2400 can further comprise the step of forming the desired shape of the cutting board system. In one embodiment, the step of forming the desired shape of the cutting board system can include the steps of assembling and arranging the long rectangular prisms of the cured and formed material so that they are adjacent and abut each other, adhering or fusing the long rectangular prisms together into a combined piece of material, sectioning off portions of the combined piece of material, and assembling and arranging the sectioned-off portions of the combined piece of material to form a general shape of the cutting board system.

In one embodiment, when the long rectangular prisms are assembled and arranged so that they are adjacent and abut each other, the plurality of long rectangular prisms can define a larger rectangular prism generally proportional to the long rectangular prisms. In another embodiment, the step of forming the desired shape of the cutting board system can include arranging the plurality of long rectangular prisms into panels by assembling the plurality of long rectangular prisms along their respective side edges, whether their long-width side edges or the short-width side edges, so that the respective ends of the plurality of long rectangular prisms align to comprise a flush surface at each end of the panel. In yet another embodiment, the step of adhering or fusing the long rectangular prisms together into a combined piece of material can be achieved through the use of adhesives. In even yet another embodiment, the step of sectioning off portions of the combined piece of material can include the step of cutting the combined piece of material into the sectioned-off portions thereof.

In one embodiment, the step of cutting the combined piece of material into the sectioned-off portions can include cutting the portions or staves to a desired dimension. Cutting the portions or staves can be achieved by cutting width-wise across the panel of long rectangular prisms. In another embodiment, the portion or staves can be cut to have a generally uniform three-inch height. In another embodiment, the step of forming the desired shape of the cutting board system can include the step of assembling or arranging the portions or staves to form the cutting board system. In one embodiment, this can include arranging the portions or staves such that the end grains are exposed on the cutting surface of the cutting board system, such that the cutting board system has a general height of approximately three (3) inches.

In another embodiment, the step of forming the desired shape of the cutting board system can include providing and coupling structural supports to the cutting board system. The structural supports can be coupled to the cutting surface of the cutting board system. In one embodiment, the structural supports can be coupled to the cutting surface in a horizontally longitudinal orientation. In another embodiment, the structural supports can be coupled to the cutting surface in a horizontally transverse orientation. In another embodiment, the structural supports can be integrally formed with the cutting board body of the cutting board system. For example, in one embodiment, the structural supports can be received within recesses formed within the sectioned-off portions before they are assembled and arranged into a combined piece of material. The cross-section of such recesses can generally correspond with the effective cross-section of the structural supports, such that the recesses can receive the structural supports. Where the sectioned-off portions are comprised of wood or wood-like material, the recesses can be machined or milled into the sectioned-off portions, including through the use of a drill, saw, router, shaper, or similar implement, to create a dado or a groove. The recesses can comprise a through dado or groove or a stopped dado or groove. In another embodiment, the recesses can be formed by drilling holes into the wood or wood-like material of the sectioned-off portions or the cutting board body. Where the sectioned-off portions are comprised of synthetic material, including moldable plastics, the recesses can be molded or formed into the sectioned-off portions. The structural supports can be placed within the recesses of the sectioned-off portions and/or between the sectioned-off portions as the cutting board system is being manufactured. In one embodiment, the structural supports can be coupled or joined to the sectioned-off portions and/or the cutting board body through the use of glue or similar adhesives.

Finally, as shown in Block 2440, the method for making the cutting board system 2400 can comprise the step of providing a drainage apparatus. The provided drainage apparatus can include the drainage apparatus as described herein. In one embodiment, the step of providing a drainage apparatus can include providing a recess to receive at least a portion of the drainage apparatus. This can include providing a recess in the cutting board body of the cutting board system and/or providing a recess in the structural supports. In one embodiment, where the cutting board body and/or the structural supports are comprised of wood or wood-like material, the recess can be machined or milled into the cutting board body and/or the structural supports, including through the use of a drill, saw, router, shaper, or similar implement, to create a dado or a groove. The recess can comprise a through dado or groove or a stopped dado or groove. In another embodiment, where the cutting board body and/or the structural supports are comprised of synthetic material, including moldable plastics, the recess can be molded or formed into the cutting board body and/or the structural supports. In one embodiment, a connection element can be provided to securingly and sealingly engage, couple, or connect elements of the drainage apparatus together to form the drainage apparatus and secure it to the cutting board system.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention.

What is claimed is:

1. A reinforced cutting board system, comprising:
   a cutting board body defining a generally planar cutting surface;
   a reinforcing system coupled to the generally planar cutting surface, the reinforcing system comprising a plurality of structural supports coupled to the generally planar cutting surface and extending horizontally below the generally planar cutting surface, the plurality of structural supports arranged at spaced intervals below the generally planar cutting surface; and
   a drainage apparatus in fluid communication with the generally planar cutting surface and comprising:
      at least one continuous lateral member defining a fluid channel;
      wherein the fluid channel comprises a distal lip;
   wherein the generally planar cutting surface comprises at least one side edge; and
   wherein the at least one side edge of the generally planar cutting surface is vertically aligned with the distal lip of the fluid channel.

2. The reinforced cutting board system of claim 1, wherein the at least one side edge of the generally planar cutting surface is located proximate the distal lip of the fluid channel.

3. The reinforced cutting board system of claim 1 further comprising:
   at least one sloped surface in fluid communication with the generally planar cutting surface and the drainage apparatus;

wherein the at least one sloped surface is located at a lesser elevation than the generally planar cutting surface and at a greater elevation than the fluid channel.

4. The reinforced cutting board system of claim 1, wherein the at least one continuous lateral member defines a continuous unitary fluid channel.

5. The reinforced cutting board system of claim 1, wherein the drainage apparatus further comprises a connection element coupled to the at least one continuous lateral member.

6. The reinforced cutting board system of claim 1, wherein the cutting board body defines a recess for receiving at least one continuous lateral member.

7. The reinforced cutting board system of claim 1, wherein the plurality of structural supports are generally rectangular in shape.

8. The reinforced cutting board system of claim 1, wherein the plurality of structural supports are generally cylindrical in shape.

9. A method for making a cutting board system, the method comprising the steps of:
 providing a suitable material;
 forming a desired shape of the cutting board system; and
 providing a drainage apparatus;
 wherein the drainage apparatus comprises at least one continuous lateral member defining a fluid channel;
 wherein the fluid channel comprises a distal lip;
 wherein the cutting board system includes a cutting surface;
 wherein the cutting surface is located at a greater elevation than the distal lip of the fluid channel;
 wherein the step of forming a desired shape of the cutting board system further comprises the steps of:
  providing a plurality of structural supports, wherein the structural supports are generally cylindrical in shape; and
  coupling the structural supports to the cutting board system;
 preparing the suitable material into a plurality of long rectangular prisms;
 assembling the plurality of long rectangular prisms to abut and be adjacent;
 fusing the plurality of long rectangular prisms together to form a combined piece of material;
 sectioning off a plurality of portions of the combined piece of material; and
 assembling the plurality of portions to form a general shape of the cutting board system.

10. The method of claim 9, wherein the step of sectioning off a plurality of portions of the combined piece of material further comprises the step of:
 cutting the combined piece of material into the plurality of portions;
 wherein the plurality of portions have a generally uniform height.

11. The method of claim 10, wherein the step of providing a drainage apparatus further comprises the steps of:
 forming an apparatus recess within the cutting board system; and
 receiving the drainage apparatus within the apparatus recess.

12. The method of claim 11, wherein the drainage apparatus further comprises a connection element coupled to the at least one continuous lateral member.

13. The method of claim 9, wherein the step of forming a desired shape of the cutting board system further comprises the steps of:
 providing a plurality of structural supports;
 forming a support recess within the plurality of portions;
 receiving the structural supports within the support recess; and
 coupling the structural supports to the cutting board system;
 wherein the support recesses define a cross-section that corresponds with the structural supports.

\* \* \* \* \*